US012633246B2

(12) United States Patent
Wang et al.

(10) Patent No.: US 12,633,246 B2
(45) Date of Patent: May 19, 2026

(54) APPARATUS AND METHOD OF CONTROLLING DISPLAY, AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Mingqiang Wang, Beijing (CN); Zheng Bao, Beijing (CN); Xing Yao, Beijing (CN); Xueying He, Beijing (CN); Gong Chen, Beijing (CN); Zan Luo, Beijing (CN); Yi Zhang, Beijing (CN); Lian Xiang, Beijing (CN); Yuan Fang, Beijing (CN); Yuren Zhang, Beijing (CN); Jiaxiang Zhang, Beijing (CN); Bin Zhang, Beijing (CN)

(73) Assignees: Chengdu BOE Optoelectronics Technology Co., Ltd., Chengdu (CN); BOB Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/839,721

(22) PCT Filed: Sep. 8, 2023

(86) PCT No.: PCT/CN2023/117712

§ 371 (c)(1),
(2) Date: Aug. 19, 2024

(87) PCT Pub. No.: WO2025/050380

PCT Pub. Date: Mar. 13, 2025

(65) Prior Publication Data

US 2025/0182672 A1 Jun. 5, 2025

(51) Int. Cl.
*G09G 3/20* (2006.01)

(52) U.S. Cl.
CPC ... *G09G 3/2096* (2013.01); *G09G 2320/0247* (2013.01); *G09G 2320/0626* (2013.01); *G09G 2320/08* (2013.01)

(58) Field of Classification Search
CPC ......... G09G 3/2096; G09G 2320/0247; G09G 2320/0626; G09G 2320/08; G09G 3/20; G09G 3/32; G09G 5/10
See application file for complete search history.

(56) References Cited

U.S. PATENT DOCUMENTS

| | | | |
|---|---|---|---|
| 9,928,783 | B2 | 3/2018 | Kim et al. |
| 10,672,317 | B2 | 6/2020 | Lee et al. |

(Continued)

FOREIGN PATENT DOCUMENTS

| | | | |
|---|---|---|---|
| CN | 106991962 | A | 7/2017 |
| CN | 110085153 | A | 8/2019 |

(Continued)

*Primary Examiner* — Towfiq Elahi

(74) *Attorney, Agent, or Firm* — Westman, Champlin & Koehler, P.A.

(57) ABSTRACT

An apparatus and a method of controlling display, and a display device are provided, which is applicable to a field of display. The apparatus includes: a first control circuit configured to, in response to an instruction being detected, control a display device to enter a display transition period, allow a first control signal to be at an active level at a first predetermined time of the display transition period, and allow a second control signal to be at an inactive level at a second predetermined time of the display transition period; and a display circuit configured to, in response to a detection that the second control signal is at the inactive level, control the display device to display in the second display mode according to the first control signal during a display period, where the second control signal controls the display device to display in the first display mode.

19 Claims, 18 Drawing Sheets

(56) References Cited

U.S. PATENT DOCUMENTS

| | | | | |
|---|---|---|---|---|
| 11,348,519 | B2 | 5/2022 | Nam | |
| 11,609,657 | B2 | 3/2023 | Chen et al. | |
| 12,033,554 | B2 * | 7/2024 | Zong | G09G 3/20 |
| 12,105,909 | B2 | 10/2024 | Chen et al. | |
| 2011/0032231 | A1 * | 2/2011 | Maruyama | G09G 3/2096 345/208 |
| 2017/0124960 | A1 | 5/2017 | Kim et al. | |
| 2019/0189048 | A1 * | 6/2019 | Hong | G09G 5/393 |
| 2019/0228694 | A1 | 7/2019 | Lee et al. | |
| 2020/0294438 | A1 | 9/2020 | Lee et al. | |
| 2021/0327350 | A1 | 10/2021 | Nam | |
| 2021/0349599 | A1 | 11/2021 | Chen et al. | |
| 2023/0251739 | A1 | 8/2023 | Chen et al. | |
| 2024/0161700 | A1 * | 5/2024 | Sun | G09G 5/006 |

FOREIGN PATENT DOCUMENTS

| | | | |
|---|---|---|---|
| CN | 113554974 | A | 10/2021 |
| CN | 113625902 | A | 11/2021 |
| CN | 114495791 | A | 5/2022 |
| CN | 114648943 | A | 6/2022 |
| CN | 114968143 | A | 8/2022 |

* cited by examiner

APPARATUS AND METHOD OF CONTROLLING DISPLAY, AND DISPLAY DEVICE

CROSS-REFERENCE TO RELATED APPLICATION(S)

This application is a Section 371 National Stage Application of International Application No. PCT/CN2023/117712, filed on Sep. 8, 2023, entitled "APPARATUS AND METHOD OF CONTROLLING DISPLAY, AND DISPLAY DEVICE", the content of which is incorporated herein by reference in its entirety.

TECHNICAL FIELD

The present disclosure relates to a field of display technology, in particular to an apparatus and a method of controlling display, and a display device.

BACKGROUND

With a development of information science and technology, display technology has also been developed. A display device may have a variety of display modes, and in different usage scenarios, the display device may display in a display mode corresponding to a usage scenario.

SUMMARY

In view of the above problems, the present disclosure provides an apparatus and a method of controlling display, and a display device.

In a first aspect of the present disclosure, an apparatus of controlling display is provided, including:

a first control circuit configured to, in response to a display mode switching instruction for switching from a first display mode to a second display mode being detected, control a display device to enter a display transition period, allow a first control signal to be at an active level at a first predetermined time of the display transition period, and allow a second control signal to be at an inactive level at a second predetermined time of the display transition period; and a display circuit configured to, in response to a detection that the second control signal is at the inactive level, control the display device to display in the second display mode according to the first control signal during a display period;

where the second control signal is configured to control the display device to display in the first display mode.

In a second aspect of the present disclosure, a display device is provided, including:

the apparatus of controlling display according to embodiments of the present disclosure; and a display module configured to display in a second display mode according to a first control signal provided by the apparatus of controlling display.

In a third aspect of the present disclosure, a method of controlling display is provided, which is applicable to the apparatus of controlling display according to embodiments of the present disclosure, the method including:

controlling, by using a first control circuit, a display device to enter a display transition period, allowing a first control signal to be at an active level at a first predetermined time of the display transition period, and allowing a second control signal to be at an inactive level at a second predetermined time of the display transition period, in response to a display mode switching instruction for switching from a first display mode to a second display mode being detected; and controlling, by using a display circuit, the display device to display in the second display mode according to the first control signal during a display period, in response to a detection that the second control signal is at the inactive level;

where the second control signal is configured to control the display device to display in the first display mode.

BRIEF DESCRIPTION OF THE DRAWINGS

The above contents and other objectives, features and advantages of the present disclosure will be more apparent through the following descriptions of embodiments of the present disclosure with reference to the accompanying drawings. In the accompanying drawings.

DETAILED DESCRIPTION OF EMBODIMENTS

Embodiments of the present disclosure will be described below with reference to the accompanying drawings. However, it should be understood that these descriptions are just exemplary and are not intended to limit the scope of the present disclosure. In the following detailed description, for ease of interpretation, many specific details are set forth to provide comprehensive understanding of the embodiments of the present disclosure. However, it is clear that one or more embodiments may also be implemented without these specific details. In addition, in the following description, descriptions of well-known structures and technologies are omitted to avoid unnecessarily obscuring concepts of the present disclosure. It should be noted that the shape and size of each component in the figures do not reflect the actual size and ratio, but just illustrate the contents of the embodiments of the present disclosure.

Terms are used herein for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

A display device may display in a display mode corresponding to a usage scenario.

For example, if the usage scenario is a power-saving scenario, the display mode may be a power-saving mode. If the usage scenario is a normal usage scenario, the display mode may be a normal display mode. The display device in embodiments of the present disclosure may be a mobile phone, a smart watch, a notebook, or other device having a display panel, which is not limited here.

Figure 1A:
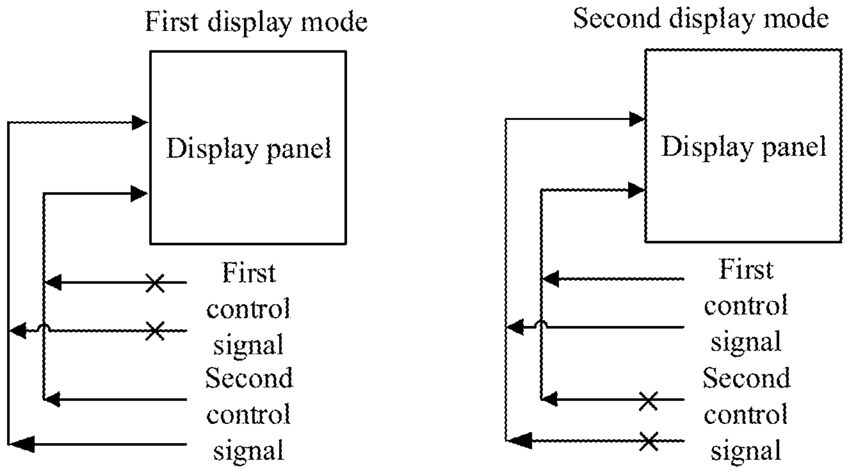
FIG. 1A schematically shows a schematic diagram of a signal control for a first display mode and a second display mode according to an example.
Figure 1B:
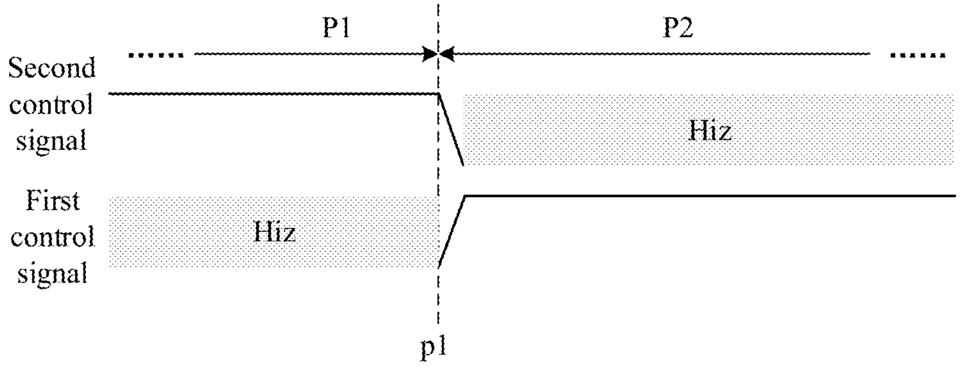
FIG. 1B schematically shows a signal timing diagram of switching from the first display mode to the second display mode according to the example.

FIG. 1A schematically shows a schematic diagram of a signal control for a first display mode and a second display mode according to an example. FIG. 1B schematically shows a signal timing diagram of switching from the first display mode to the second display mode according to the example.

As shown in FIG. 1A, the first display mode and the second display mode may have different display frequencies. For example, the display frequency in the first display mode may be greater than that in the second display mode. In the first display mode, a second control signal may be used to control a display panel to display in the first display mode, and a first control signal does not control the display panel. In the second display mode, the first control signal may control the display panel to display in the second display mode, and the second control signal does not control the display panel.

As shown in FIG. 1B, during a period P1, the display device is in the first display mode, where the second control signal is at a high level, and the first control signal is in a high impedance state (i.e., Hiz). At a time p1, the display device is switched from the first display mode to the second display mode, where the first control signal is adjusted from the high impedance state to a high level, and the second control signal is adjusted from the high level to a high impedance state. During a period P2, the display device is in the second display mode, where the first control signal is at a high level, and the second control signal is in a high impedance state. The high level may be an active level, and the high impedance state may be an inactive level. When the first control signal is adjusted to the active level, the first control signal may be in an unstable state, resulting in a current flowing through the display device is also unstable. Since an actual brightness value of the display device is positively correlated with the current of the display device, the actual brightness value of the display device may fluctuate to cause a screen flicker when the first control signal is unstable.

In view of this, the present disclosure proposes an apparatus of controlling display, with which a display device may enter a display transition period when a display mode switching instruction is detected. The second control signal is in a stable state during the display transition period, and the first control signal transitions from an unstable state to a stable state through the display transition period. An addition of the display transition period may help the first control signal to enter the stable state. During the display transition period, the display device is controlled to display according to the second control signal which is stable, and during a display period, the display device is controlled to display according to the first control signal which is stable. In this way, it is possible to avoid a flickering phenomenon of the display device in a case of controlling the display device to display directly by the unstable first control signal when the display mode switching instruction is detected, thereby improving a display effect of the display device.

Figure 2A:
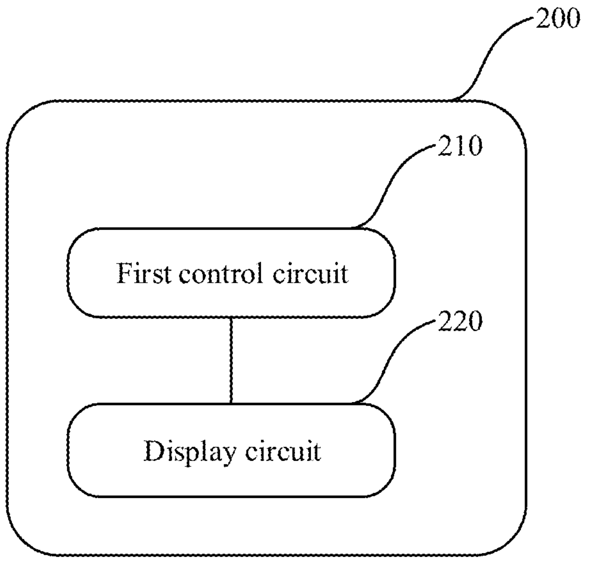
FIG. 2A schematically shows a block diagram of an apparatus of controlling display according to an embodiment of the present disclosure.

FIG. 2A schematically shows a block diagram of an apparatus of controlling display according to an embodiment of the present disclosure.

As shown in FIG. 2A, an apparatus 200 of controlling display may include a first control circuit 210 and a display circuit 220.

The first control circuit 210 may be configured to, in response to a display mode switching instruction for switching from a first display mode to a second display mode being detected, control a display device to enter a display transition period, allow a first control signal to be at an active level at a first predetermined time of the display transition period, and allow a second control signal to be at an inactive level at a second predetermined time of the display transition period.

The display circuit 220 may be configured to, during a display period, control the display device to display in a second display mode according to the first control signal in response to a detection that the second control signal is at the inactive level.

The second control signal is used to control the display device to display in the first display mode.

According to embodiments of the present disclosure, the first display mode and the second display mode may have different display frequencies. For example, the display frequency of the first display mode may be 60 Hz, and the display frequency of the second display mode may be 30 Hz. Accordingly, when it is required to reduce the display frequency, it is possible to switch from the first display mode to the second display mode, so as to display in the second display mode having a lower display frequency.

A maximum actual brightness value in the first display mode may be different from that in the second display mode. For example, the maximum actual brightness value in the first display mode may be 650 nits, and the maximum actual brightness value in the second display mode may be 150 nits. When it is required to reduce an actual brightness value of the display device, it is possible to switch from the first display mode to the second display mode, so as to display in the second display mode having a lower maximum actual brightness value. The actual brightness value may be a brightness value of an actual luminance of the display device.

The display mode switching instruction may be received through a processor interface (e.g., Mobile Industry Processor Interface (MIPI)) of the display device.

The display transition period may be a period in which the first control signal is made to reach a stable state. The stable state may avoid a flickering phenomenon of a display screen of the display device in a case that the display device is controlled to display according to the first control signal.

The first predetermined time of the display transition period may be a time before the second predetermined time of the display transition period. The first predetermined time of the display transition period and the second predetermined time of the display transition period may be any time between a start time and an end time of the display transition period. The first predetermined time of the display transition period may also be the start time of the display transition period, and the second predetermined time of the display transition period may also be the end time of the display transition period.

At the first predetermined time of the display transition period, the first control signal may be adjusted to an active level. At the second predetermined time of the display transition period, the second control signal may be adjusted to an inactive level.

During the display transition period, the first control signal may be in an unstable state, and the second control signal is at an active level in a stable state. Therefore, during the display transition period, the second control signal in the stable state controls the display device to display.

The display period may be a period after the display transition period. For example, the second predetermined time of the display transition period may be followed by the display period. The first control signal may be in a stable state at the second predetermined time of the display transition period. Therefore, during the display period, the display device may be controlled to display in the second display mode according to the first control signal in the stable state, so that a flickering phenomenon of the display screen of the display device may be avoided.

In a case that the active level is a high level, the inactive level may be a high impendence state or a low level. In a case that the active level is a low level, the inactive level may be a high impedance state or a high level. For example, the active level of the first control signal may be a high level, and the inactive level of the first control signal may be a low level or a high impedance. The active level of the second control signal may be a high level, and the inactive level of the second control signal may be a high impedance or a low level.

A timing variation of the first control signal and the second control signal will be described below with reference to FIG. 2B.

Figure 2B:
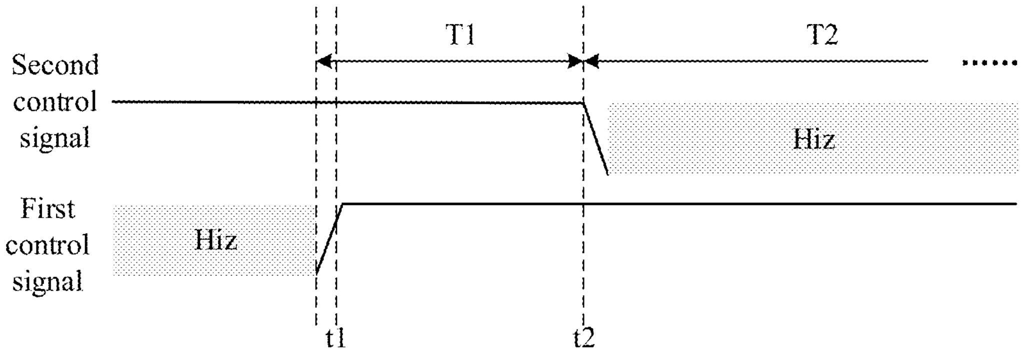
FIG. 2B schematically shows a signal timing diagram of an apparatus of controlling display according to an embodiment of the present disclosure.

FIG. 2B schematically shows a signal timing diagram of an apparatus of controlling display according to an embodiment of the present disclosure.

As shown in FIG. 2B, at a first predetermined time t1 of a display transition period T1, the first control signal is made to be at an active level. At a second predetermined time t2 of the display transition period T1, the second control signal is made to be at an inactive level. During a display period T2, the second control signal is at the inactive level, and the display device is controlled to display in the second display mode according to the first control signal.

When a display mode switching instruction being detected, the display device may enter the display transition period. The second control signal is in a stable state during the display transition period, and the first control signal transitions from an unstable state to a stable state through the display transition period. An addition of the display transition period may help the first control signal to enter the stable state. During the display transition period, the display device is controlled to display according to the second control signal which is stable, and during a display period, the display device is controlled to display according to the first control signal which is stable. In this way, it is possible to avoid a flickering phenomenon of the display device in a case of controlling the display device to display directly by the unstable first control signal when the display mode switching instruction is detected, thereby improving the display effect of the display device.

The first control circuit 210 may include a timing control sub-circuit and a brightness control sub-circuit.

The timing control sub-circuit may allow the first control signal to be at an active level at the first predetermined time of the display transition period, and allow the second control signal to be at an inactive level at the second predetermined time of the display transition period.

The brightness control sub-circuit may determine a first display brightness value corresponding to the second display mode according to a first actual brightness value corresponding to the second display mode during the display transition period.

The display circuit 220 may control the display device to display in the second display mode according to the first control signal by configuring a display brightness value of the display device as the first display brightness value under the control of the first control signal, so that the display device displays with the first actual brightness value.

For the timing control sub-circuit, reference may be made to the first control circuit, which will not be repeated here.

According to the display brightness value (DBV), the display device may be controlled to display with the actual brightness value corresponding to the display brightness value in the corresponding display mode. A relationship between the display brightness value and the actual brightness value may be determined by Gamma tuning.

The first display brightness value may be a value used to control the display device to display with the first actual brightness value in the second display mode. In order to enable the display device to display with the first actual brightness value, it is possible to determine the first display brightness value corresponding to the first actual brightness value through Gamma tuning and configure the display brightness value of the display device as the first display brightness value, so that the display device may display with the first actual brightness value.

In order to determine the first display brightness value corresponding to the second display mode according to the first actual brightness value corresponding to the second display mode, the brightness control sub-circuit may be further used to, in response to a display brightness value switching instruction being detected, determine the first display brightness value corresponding to the second display mode from one of a first set of mapping relationships and a second set of mapping relationships according to the first actual brightness value corresponding to the second display mode.

The brightness control sub-circuit may be further used to determine the first display brightness value corresponding to the second display mode from the first set of mapping relationships according to the first actual brightness value corresponding to the second display mode.

The first set of mapping relationships includes at least one first mapping relationship. The first mapping relationship represents a relationship between the actual brightness value and the display brightness value in a case of supplying power to the display device by a power management integrated circuit (PMIC). The second set of mapping relationships includes at least one second mapping relationship. The second mapping relationship represents a relationship between the actual brightness value and the display brightness value in a case of supplying power to the display device by a display driver integrated circuit (DDIC).

The display brightness value switching instruction may be an instruction used to switch the second actual brightness value corresponding to the first display mode to the first actual brightness value corresponding to the second display mode. The second actual brightness value may be an actual brightness value matched with the second display mode.

The first set of mapping relationships may be obtained by Gamma tuning by supplying power to the display device through the PMIC, and the second set of mapping relationships may be obtained by Gamma tuning by supplying power to the display device through the DDIC. In a case that the display device is powered by the DDIC, a voltage is small, and a maximum value of the actual brightness value with which the display device may display is less than a maximum value of the actual brightness value with which the display device may display in a case that the display device is powered by the PMIC. For example, the maximum value of the actual brightness value in the first set of mapping relationships may be 650 nits, and the maximum value of the actual brightness value in the second set of mapping relationships may be 150 nits.

A display brightness value in the first set of mapping relationships and the same display brightness value in the second set of mapping relationships may correspond to different actual brightness values. For example, in the first set of mapping relationships, the display brightness value of 255 may correspond to the actual brightness value of 650 nits, and in the second set of mapping relationships, the display brightness value of 255 may correspond to the actual brightness value of 150 nits.

A display brightness value in the first set of mapping relationships and a different display brightness value in the second set of mapping relationships may correspond to the same actual brightness value. For example, in the first set of mapping relationships, the display brightness value of 59 may correspond to the actual brightness value of 150 nits, and in the second set of mapping relationships, the display brightness value of 255 may correspond to the actual brightness value of 150 nits.

In a case that the first actual brightness value is different from the second actual brightness value, it is needed to switch the second actual brightness value corresponding to the first display mode to the first actual brightness value corresponding to the second display mode through the display brightness value switching instruction.

In a case that the first actual brightness value is the same as the second actual brightness value, it may be determined whether the actual brightness value in the first display mode and the actual brightness value in the second display mode are determined by the same set of mapping relationships. In a case that the actual brightness value in the first display mode and the actual brightness value in the second display mode are determined by different sets of mapping relationships, it is needed to switch the second actual brightness value corresponding to the first display mode to the first actual brightness value corresponding to the second display mode through the display brightness value switching instruction. If it is determined that the actual brightness value in the first display mode and the actual brightness value in the second display mode are determined by the same set of mapping relationships, that is, the display brightness value corresponding to the first actual brightness value is the same as the display brightness value corresponding to the second actual brightness value, it is not needed to switch the display brightness value through a display brightness value switching instruction. A range of the actual brightness value in the first set of mapping relationships is greater than that in the second set of mapping relationships. Therefore, if it is determined that the actual brightness value in the first display mode and the actual brightness value in the second display mode are determined by the same set of mapping relationships, the first set of mapping relationships is that set of mapping relationships.

It is possible to determine the set of mapping relationships matched with the second display mode, determine the mapping relationship matched with the first actual brightness value from the set of mapping relationships matched with the second display mode according to the first actual brightness value, and determine the first display brightness value according to the mapping relationship.

According to the embodiments of the present disclosure, the actual brightness value in the first display mode and the actual brightness value in the second display mode may be determined by different sets of mapping relationships.

For example, if the first display mode is a normal mode and the second display mode is an always on display (AOD) mode, the first control signal is a control signal provided by the DDIC, and the second control signal is a control signal provided by the PMIC. The actual brightness value in the first display mode may be determined according to the first set of mapping relationships, and the actual brightness value in the second display mode may be determined according to the second set of mapping relationships.

If the first display mode is the AOD mode and the second display mode is the normal mode, the first control signal is a control signal provided by the PMIC, and the second control signal is a control signal provided by the DDIC. The actual brightness value in the first display mode may be determined according to the second set of mapping relationships, and the actual brightness value in the second display mode may be determined according to the first set of mapping relationships.

The normal mode may be a display mode of the display device in a state of use, and the AOD mode may be a display mode of the display device in a state of non-use. The display device in the AOD mode may display only simple information such as clock.

The actual brightness value in the first display mode and the actual brightness value in the second display mode may be determined by the same set of mapping relationships.

For example, if the first display mode is the normal mode and the second display mode is the AOD mode, the actual brightness value in the normal mode and the actual brightness value in the AOD mode may both be determined according to the first set of mapping relationships. However, a portion of the actual brightness values in the first set of mapping relationships may be unavailable in the AOD mode because the first control signal in the AOD mode is a control signal provided by the DDIC and a voltage of the control signal that the DDIC may provide is lower than a voltage of the control signal that the PMIC may provide.

According to embodiments of the present disclosure, because a voltage conversion efficiency of the DDIC is higher than that of the PMIC, the voltage conversion efficiency may be improved by using the control signal provided by the DDIC in the AOD mode.

The first control circuit 210 may further include a first control register and a second control register.

The first control register may be configured to store the first set of mapping relationships.

The second control register may be configured to store the second set of mapping relationships.

By storing the first set of mapping relationships and the second set of mapping relationships in different control registers, the display brightness value of the display device may be controlled by independent control registers in different display modes of the display device. Compared with the method of controlling the display device by one control register, the method of controlling the display brightness value of the display device in different modes using two control registers is more flexible The first set of mapping relationships and the second set of mapping relationships may also be stored in the same control register. For example, the first control register may be configured to store the first set of mapping relationships and the second set of mapping relationships.

A display frequency corresponding to the second display mode is a first display frequency, which is determined according to a tear effect (TE) signal.

The tear effect signal may be a signal generated by the DDIC and is used to prevent tearing in picture refresh during image display. The tear effect signal may have different frequencies in different display modes. The display frequency corresponding to a display mode may be the same as the frequency of the tear effect signal in that display mode, and the first display frequency may be the same as the frequency of the tear effect signal in the second display mode. The tear effect signal may also be used as a reference signal to send instructions to an application processor.

According to embodiments of the present disclosure, because the display device in the AOD mode may be in a state of non-use, the display frequency in the AOD mode may be lower than that in the normal mode, so that a display power consumption in the AOD mode may be reduced. For example, the display frequency may be 60 Hz in the normal mode and 30 Hz in the AOD mode. Taking this as an example, if the first display mode is the normal mode and the second display mode is the AOD mode, the display frequency corresponding to the second display mode is the first display mode which is 30 Hz, and if the first display mode is the AOD mode and the second display mode is the normal mode, the display frequency corresponding to the second display mode is the first display mode which is 60 Hz.

If the first display mode is the normal mode and the second display mode is the AOD mode, the apparatus 200 of controlling display may further include a second control circuit.

The second control circuit may be configured to generate a display mode switching instruction in a case that the actual brightness value of the display device is the second actual brightness value corresponding to the first display mode.

The second actual brightness value is an actual brightness value matched with the AOD mode.

The display device may include a sensor for detecting ambient light. When the sensor of the display device detects that the ambient light has dimmed, the display device may reduce the actual brightness value of the display device. When the actual brightness value of the display device is the second actual brightness value corresponding to the normal mode, the display device may generate a display mode switching instruction for switching the display device from the normal mode to the AOD mode.

If the display device receives no operation request within a predetermined duration in the normal mode, the actual brightness value of the display device may be reduced. The predetermined duration may be 10 seconds, 20 seconds, 30 seconds, etc. If the actual brightness value of the display device is the second actual brightness value corresponding to the normal mode, a display mode switching instruction may be generated.

The display device may also generate a display mode switching instruction in a case of adjusting the actual brightness value of the display device to the second actual brightness value corresponding to the normal mode upon receiving from a user a switch request for switching from the normal mode to the AOD mode.

If the actual brightness value of the display device is the second actual brightness value corresponding to the first display mode, the second actual brightness value is an actual brightness value matched with the AOD mode, that is, it is possible to switch from the first display mode to the AOD mode in a case that the actual brightness value remains unchanged, so that a screen flicker of the display device may be avoided.

Through the second actual brightness value, it may be determined whether the first display mode meets a condition of switching to the second display mode. If it is determined that the actual brightness value of the display device is the second actual brightness value corresponding to the first display mode, it may be determined that the actual brightness value of the display device meets the condition of switching to the second display mode, then a display mode switching instruction may be generated.

If the first display mode is the normal mode and the second display mode is the AOD mode, the second control circuit may be further configured to: under the control of a third control signal, adjust the display brightness value of the display device from a third display brightness value corresponding to the first display mode to a second display brightness value corresponding to the first display mode according to the first set of mapping relationships, so that the actual brightness value of the display device is adjusted from a third actual brightness value corresponding to the first display mode to a second actual brightness value corresponding to the first display mode.

The third control signal is a control signal provided by the PMIC. The third display brightness value corresponds to the third actual brightness value, and the second display brightness value corresponds to the second actual brightness value.

The third actual brightness value may be the actual brightness value of the display device in the first display mode before the display mode switching instruction is received by the display device. The third actual brightness value may be greater than the second actual brightness value.

The third actual brightness value may be an actual brightness value not matched with the AOD mode. For example, the third actual brightness value may be greater than any actual brightness value in the AOD mode. Since the first actual brightness value and the second actual brightness value are both matched with the second display mode while the third actual brightness value is not matched with the actual brightness value in the AOD mode, the display device may fail to be switched from the normal mode to the AOD mode in a case that the display device has the third actual brightness value, and it is needed to adjust the actual brightness value of the display device from the third actual brightness value corresponding to the first display mode to the second actual brightness value corresponding to the first display mode.

If the first display mode is the normal mode and the second display mode is the AOD mode, the third control signal may be the same signal as the first control signal.

If the first display mode is the normal mode and the second display mode is the AOD mode, it is possible to determine, under the control of a third control signal, a first mapping relationship matched with the second actual brightness value from the first set of mapping relationships according to the second actual brightness value, and determine the second display brightness value corresponding to the second actual brightness value according to the first mapping relationship, so that the display device is adjusted from the third display brightness value corresponding to the first display mode to the second display brightness value corresponding to the first display mode.

In order to adjust the display brightness value of the display device from the third display brightness value corresponding to the first display mode to the second display brightness value corresponding to the first display mode according to the first set of mapping relationships so that the actual brightness value of the display device is adjusted from the third actual brightness value corresponding to the first display mode to the second actual brightness value corresponding to the first display mode, the second control circuit may be further configured to gradually adjust the display brightness value of the display device from the third display brightness value corresponding to the first display mode to the second display brightness value corresponding to the first display mode according to the first set of mapping relationships, so that the actual brightness value of the display device is gradually adjusted from the third actual brightness value corresponding to the first display mode to the second actual brightness value corresponding to the first display mode.

It is possible to determine at least one intermediate display brightness value according to the third display brightness value and the second display brightness value, and adjust the display device from the third display brightness value to the at least one intermediate display brightness value and then from the at least one intermediate display brightness value to the second display brightness value according to the third display brightness value, the second display brightness value and the at least one intermediate display brightness value.

For example, it is possible to determine a display brightness value interval according to the first display brightness value and the second display brightness value, divide the display brightness value interval equally into 10 parts, 20 parts, and so on, determine at least one intermediate display brightness value corresponding to the first display mode according to the display brightness values at endpoints of equally divided display brightness value sub-intervals, adjust the display device from the third display brightness value to a first one of the intermediate display brightness values and then to a second one of the intermediate display brightness values in descending order, and so on until from a last one of the intermediate display brightness values to the second display brightness value corresponding to the first display mode. For example, the third display brightness value corresponding to the first display mode may be 200, and the second display brightness value corresponding to the first display mode may be 100, then a display brightness value interval of 100-200 may be determined, which may be divided into 10 equal parts, and 110, 120, 130, 140 . . . 180, 190 may be determined as the intermediate display brightness values. The display device may be adjusted from the third display brightness value of 200 corresponding to the first display mode to the intermediate display brightness value of 190, then from the intermediate display brightness value of 190 to the intermediate display brightness value of 180, and so on until to the second display brightness value of 100 corresponding to the first display mode.

By gradually adjusting the display brightness value of the display device from the third display brightness value corresponding to the first display mode to the second display brightness value corresponding to the first display mode, the brightness of the display device is slowly reduced when the display device is adjusted from the third actual brightness value to the second actual brightness value, which may avoid flickering of the display device in a case of adjusting the display device directly from the third actual brightness value to the second actual brightness value, and the display effect of the display device is improved.

Figure 3A:
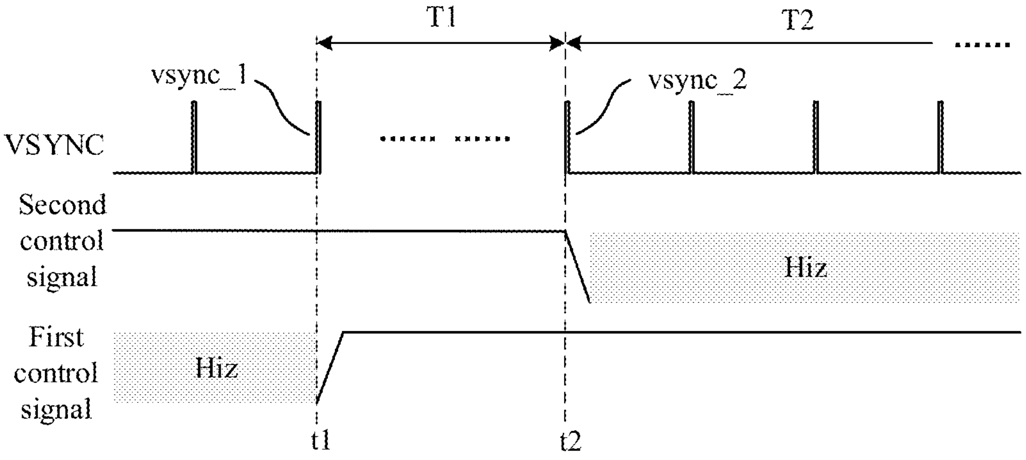
FIG. 3A schematically shows a signal timing diagram of switching from the first display mode to the second display mode according to an embodiment of the present disclosure.

FIG. 3A schematically shows a signal timing diagram of switching from the first display mode to the second display mode according to an embodiment of the present disclosure.

As shown in FIG. 3A, the display transition period T1 may be a first display transition sub-period.

In order to allow the first control signal to be at the active level at the first predetermined time of the display transition period and allow the second control signal to be at the inactive level at the second predetermined time of the display transition period, the timing control sub-circuit may be further configured to allow the first control signal to be at the active level according to a first vertical synchronization pulse vsync_1 at the first predetermined time of the first display transition sub-period, and allow the second control signal to be at the inactive level according to a second vertical synchronization pulse vsync_2 at the second predetermined time of the first display transition sub-period. The first predetermined time of the first display transition sub-period may be a first predetermined time t1 of the display transition period T1, and the second predetermined time of the first display transition sub-period may be a second predetermined time t2 of the display transition period T1.

The first vertical synchronization pulse vsync_1 is a first pulse of a first vertical synchronization signal (VSYNC) in the first display transition sub-period, and the second vertical synchronization pulse vsync_2 is a pulse away from the first vertical synchronization pulse vsync_1 by a cycle of a first display frequency in the VSYNC. The first display frequency is a display frequency corresponding to the second display mode. For example, the first display frequency may be 60 Hz.

A frequency of the first vertical synchronization signal is the same as that of the first tear effect signal corresponding to the second display mode, and the first tear effect signal is ahead of the first vertical synchronization signal by M frames, where M is greater than or equal to one-eighth and less than or equal to one-half. A frequency corresponding to each frame is the second display frequency corresponding to the first display mode.

Figure 3B:
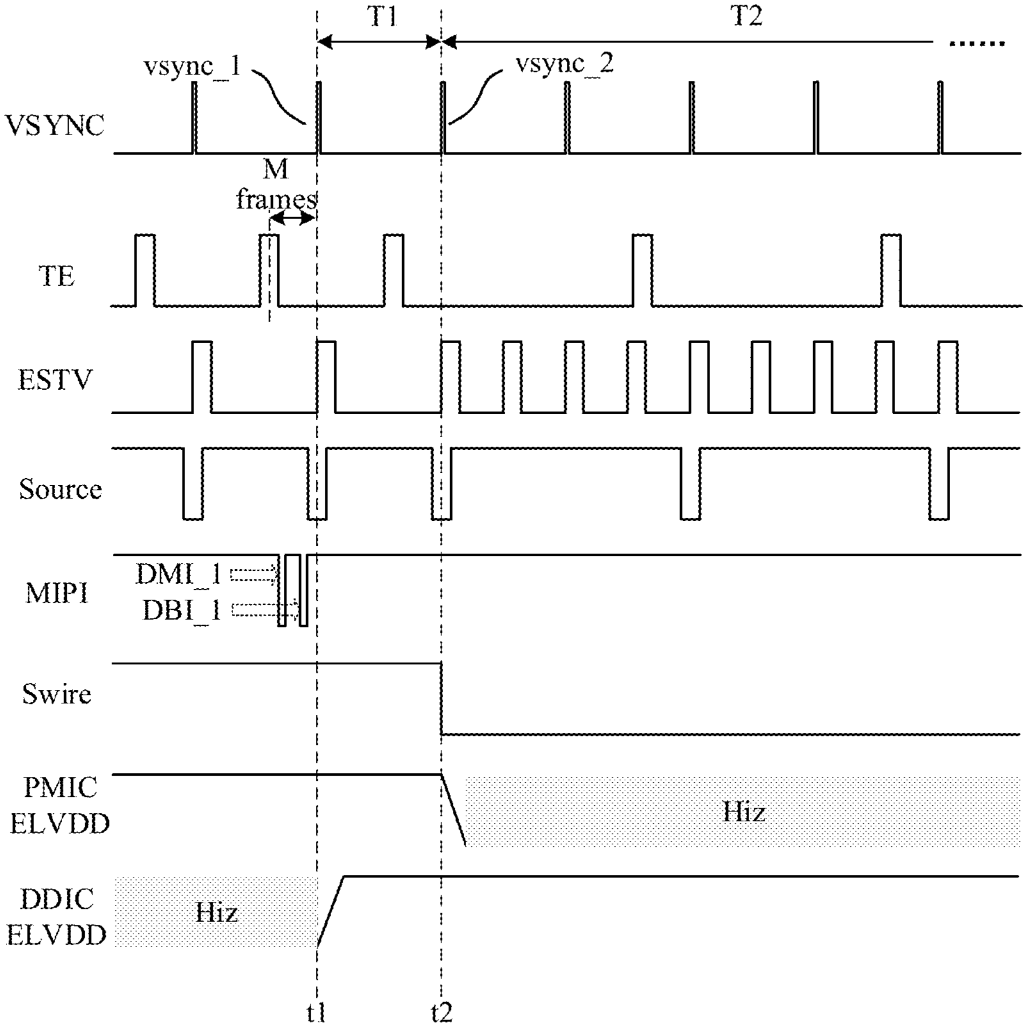
FIG. 3B schematically shows a signal timing diagram of an apparatus of controlling display according to another embodiment of the present disclosure.

FIG. 3B schematically shows a signal timing diagram of an apparatus of controlling display according to another embodiment of the present disclosure.

As shown in FIG. 3B, if the first display mode is the normal mode and the second display mode is the AOD mode, the first control signal is DDIC ELVDD, and the second control signal is PMIC ELVDD. TE is ahead of VSYNC by M frames. The actual brightness value in the first display mode is determined by the first set of mapping relationships stored in the first control register, and the actual brightness value in the second display mode is determined by the second set of mapping relationships stored in the second control register.

In FIG. 3B, a display mode switching instruction DMI_1 for switching from the normal mode to the AOD mode and a display brightness value switching instruction DBI_1 are received through the MIPI of the display device. The display mode switching instruction DMI_1 may be 0×39 for example, and the display brightness value switching instruction DBI_1 may be 69*h* for example. At the first predetermined time of the first display transition sub-period, which may be a first predetermined time t1 of a display transition period T1 shown in FIG. 3B, the first vertical synchronization pulse vsync_1 is detected, and the display mode switching instruction DMI_1 is triggered to adjust the second control signal from the inactive level to the active level. During the first display transition sub-period, which may be a display transition period T1 shown in FIG. 3B, a rising edge of the TE is detected, and the TE is adjusted from the second display frequency to the first display frequency, for example, from 60 Hz to 30 Hz. At the second predetermined time of the first display transition sub-period, which may be a second predetermined time t2 of the display transition period T1 shown in FIG. 3B, the second vertical synchronization pulse vsync_2 is detected, the display brightness value switching instruction DBI_1 is triggered to adjust the second control signal to the inactive level, an emission start vertical (ESTV) signal is adjusted from one pulse per frame in the first display mode to four pulses per frame in the second display mode, a source is adjusted from the second display brightness value corresponding to the second actual brightness value in the first display mode to the first display brightness value corresponding to the first actual brightness value in the first display mode, and a control signal (i.e., Swire) used to control the second control signal is adjusted from an active level to an inactive level.

Figure 3C:
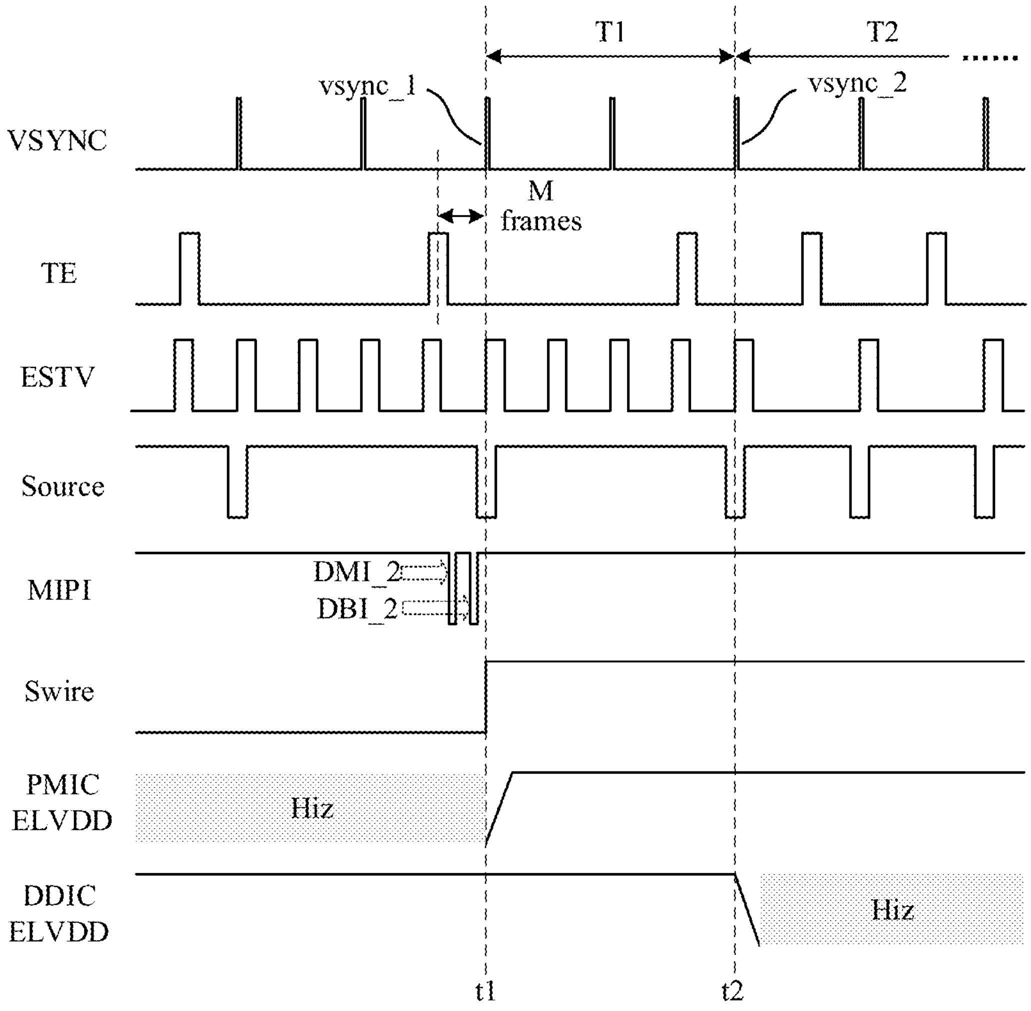
FIG. 3C schematically shows a signal timing diagram of an apparatus of controlling display according to another embodiment of the present disclosure.

FIG. 3C schematically shows a signal timing diagram of an apparatus of controlling display according to another embodiment of the present disclosure.

As shown in FIG. 3C, different from FIG. 3B, the first display mode is the AOD mode, the second display mode is the normal mode, the first control signal is PMIC ELVDD, and the second control signal is DDIC ELVDD. The actual brightness value in the first display mode is determined by the second set of mapping relationships stored in the second control register, and the actual brightness value in the second display mode is determined by the first set of mapping relationships stored in the first control register.

In FIG. 3C, a display mode switching instruction DMI_2 for switching from the AOD mode to the normal mode and a display brightness value switching instruction DBI_2 are received through the MIPI of the display device. The display mode switching instruction DMI_2 may be 0×38 for example, and the display brightness value switching instruction DBI_2 may be 51*h* for example. At the first predetermined time of the first display transition sub-period, which may be a first predetermined time t1 of a display transition period T1 shown in FIG. 3C, the first vertical synchronization pulse vsync_1 is detected, and the DMI_2 is triggered to adjust the second control signal from the inactive level to the active level. During the first display transition sub-period, which may be a display transition period T1 shown in FIG. 3C, the rising edge of the TE is detected, and the TE is switched from the second display frequency to the first display frequency. At the second predetermined time of the first display transition sub-period, which may be a second predetermined time t2 of the display transition period T1 shown in FIG. 3C, the second vertical synchronization pulse vsync_2 is detected, and the DBI_2 is triggered to adjust the first control signal from the active level to the inactive level, switch the ESTV from four pulses per frame in the first display mode to one pulse per frame in the second display mode, adjust the second display brightness value corresponding to the second actual brightness value in the first display mode to the first display brightness value corresponding to the first actual brightness value in the first display mode, and adjust the Swire from the active level to the inactive level.

The sets of mapping relationships corresponding to the normal mode and the AOD mode in FIG. 3B and FIG. 3C are respectively stored in two control registers. Therefore, the display brightness value switching instruction DBI_1 for switching from the normal mode to the AOD mode and the display brightness value switching instruction DBI_2 for switching from the AOD mode to the normal mode correspond to different control registers.

Figure 3D:
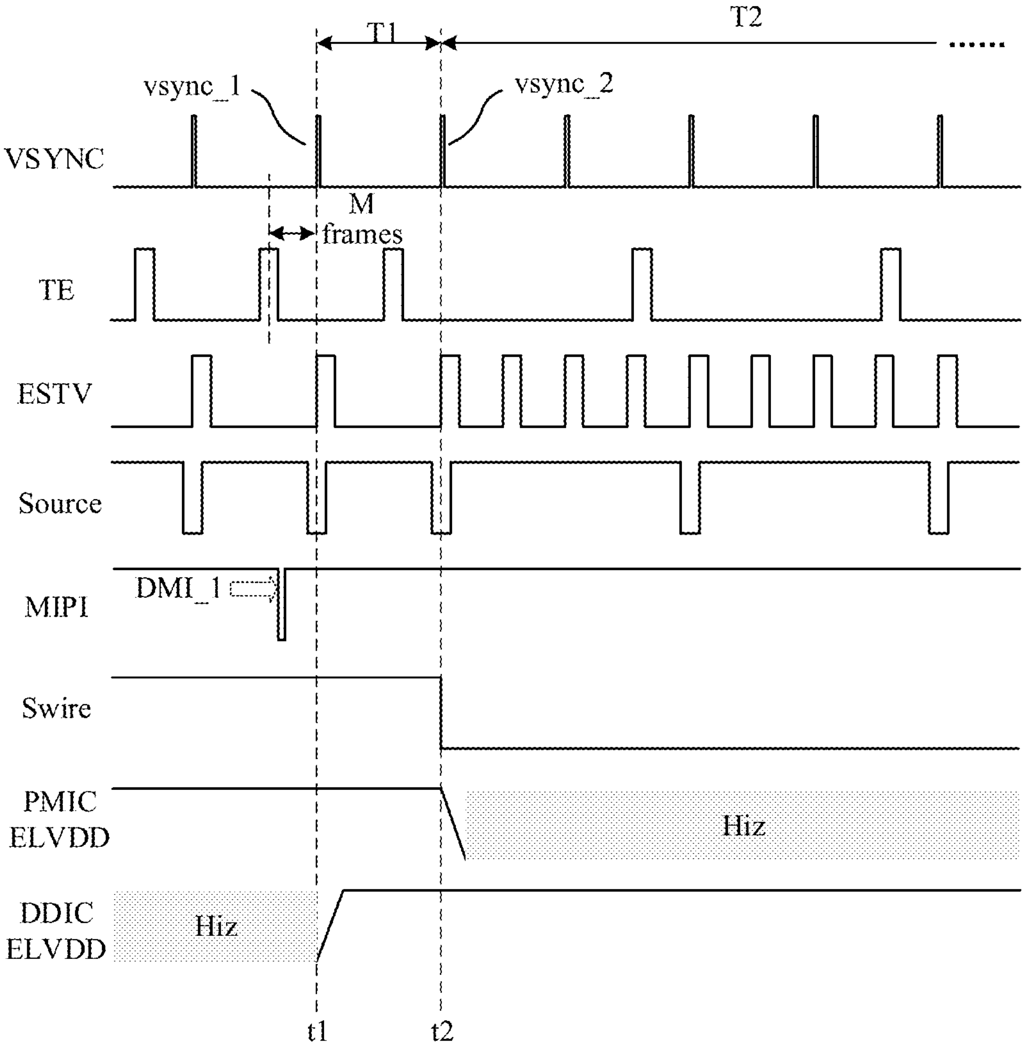
FIG. 3D schematically shows a signal timing diagram of an apparatus of controlling display according to another embodiment of the present disclosure.

FIG. 3D schematically shows a signal timing diagram of an apparatus of controlling display according to another embodiment of the present disclosure.

As shown in FIG. 3D, different from FIG. 3B, the actual brightness value in the first display mode and the actual brightness value in the second display mode are both determined by the first set of mapping relationships.

Since the actual brightness value in the first display mode and the actual brightness value in the second display mode are both determined by the first set of mapping relationships, in a case that the second actual brightness value corresponding to the first display mode is identical with the first actual brightness value corresponding to the second display mode, the display brightness value switching instruction may not be required, and it is only needed to receive the display mode switching instruction DMI_1 through the MIPI of the display device. For changes in other signals in FIG. 3D, reference may be made to FIG. 3B, which will not be repeated here.

Figure 3E:
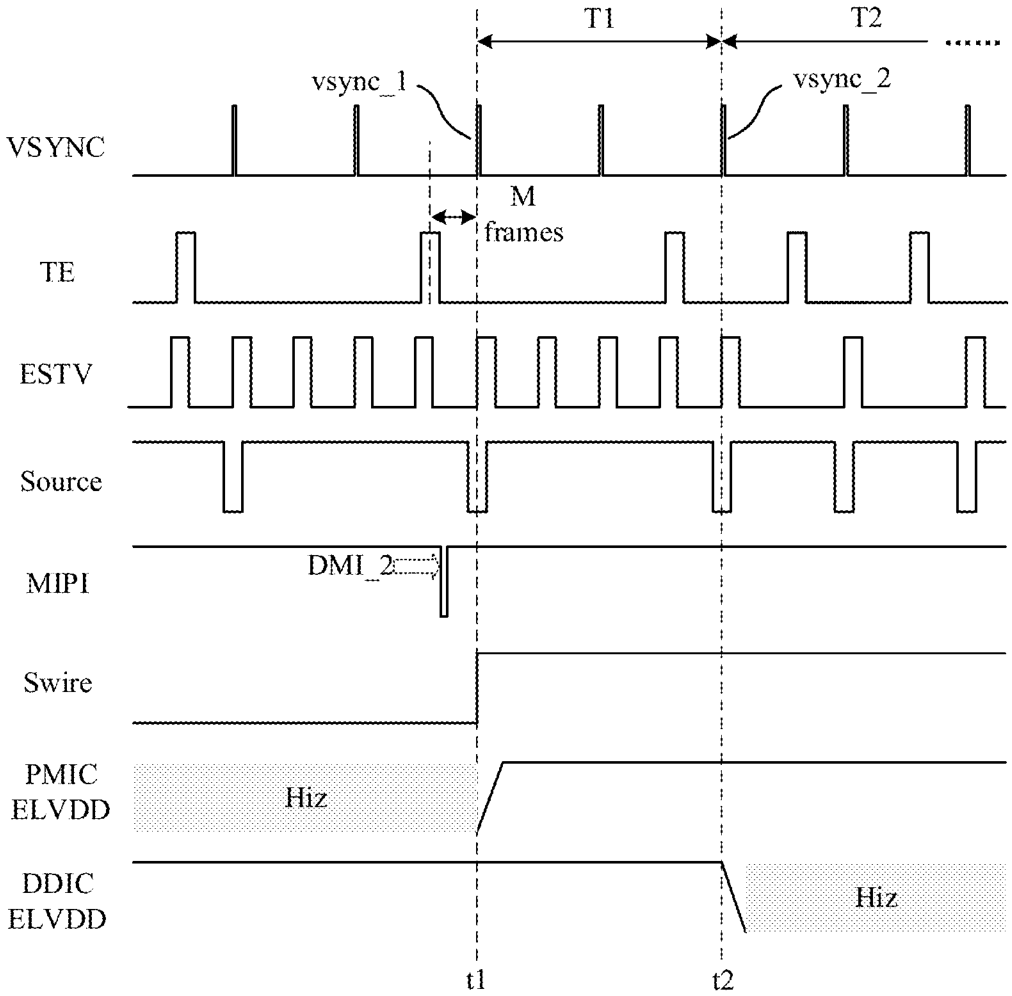
FIG. 3E schematically shows a signal timing diagram of an apparatus of controlling display according to another embodiment of the present disclosure.

FIG. 3E schematically shows a signal timing diagram of an apparatus of controlling display according to another embodiment of the present disclosure.

As shown in FIG. 3E, different from FIG. 3C, the actual brightness value in the first display mode and the actual brightness value in the second display mode are both determined by the first set of mapping relationships.

Since the actual brightness value in the first display mode and the actual brightness value in the second display mode are both determined by the first set of mapping relationships, in a case that the second actual brightness value corresponding to the first display mode is identical with the first actual brightness value corresponding to the second display mode, the display brightness value switching instruction may not be required, and it is only needed to receive the display mode switching instruction DMI_2 through the MIPI of the display device. For changes in other signals in FIG. 3E, reference may be made to FIG. 3C, which will not be repeated here.

In FIG. 3D and FIG. 3E, the display brightness value switching instruction is not required, and an execution of the display brightness value switching instruction is eliminated, so that an efficiency of display mode switching may be improved.

For ease of understanding, in FIG. 3A to FIG. 3E, the start time of the display transition period is shown as the first predetermined time t1 of the display transition period T1, and the end time of the display transition period is shown as the second predetermined time t2 of the display transition period T1. However, the present disclosure is not limited thereto. The start time of the display transition period may also be a time before the first predetermined time t1 of the display transition period T1, and the end time of the display transition period may also be a time after the second predetermined time t2 of the display transition period T1.

Figure 4A:
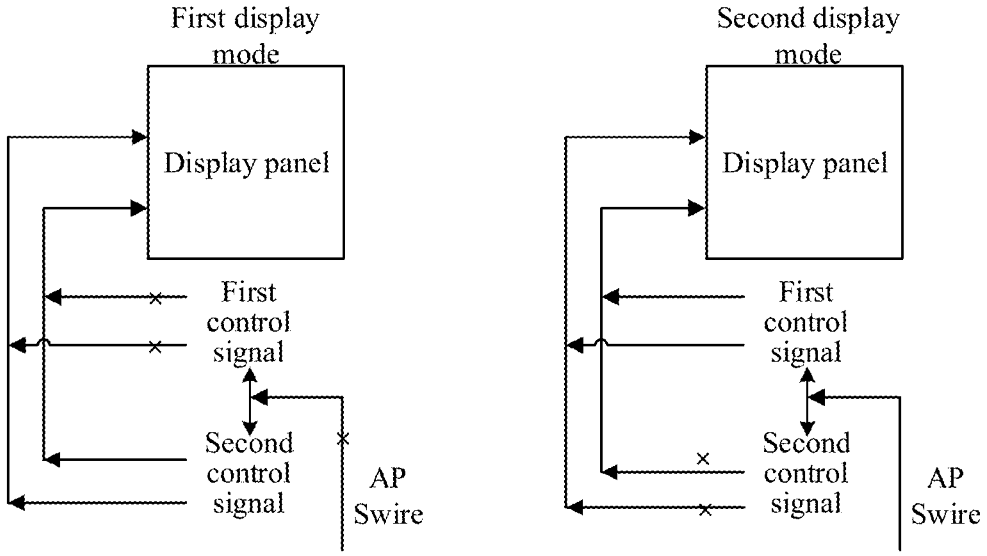
FIG. 4A schematically shows a schematic diagram of signal control for a first display mode and a second display mode according to an embodiment of the present disclosure.

FIG. 4A schematically shows a schematic diagram of signal control for a first display mode and a second display mode according to an embodiment of the present disclosure.

As shown in FIG. 4A, the apparatus of controlling display may further include an application processor control circuit, which connects a control pin for controlling the first control signal and a control pin for controlling the second control signal. In a case of switching from the first display mode to the second display mode, the application processor control circuit may provide a first auxiliary control signal (e.g., Application Swire, AP Swire), and the AP Swire controls the second control signal to maintain the active level during the display transition period.

Figure 4B:
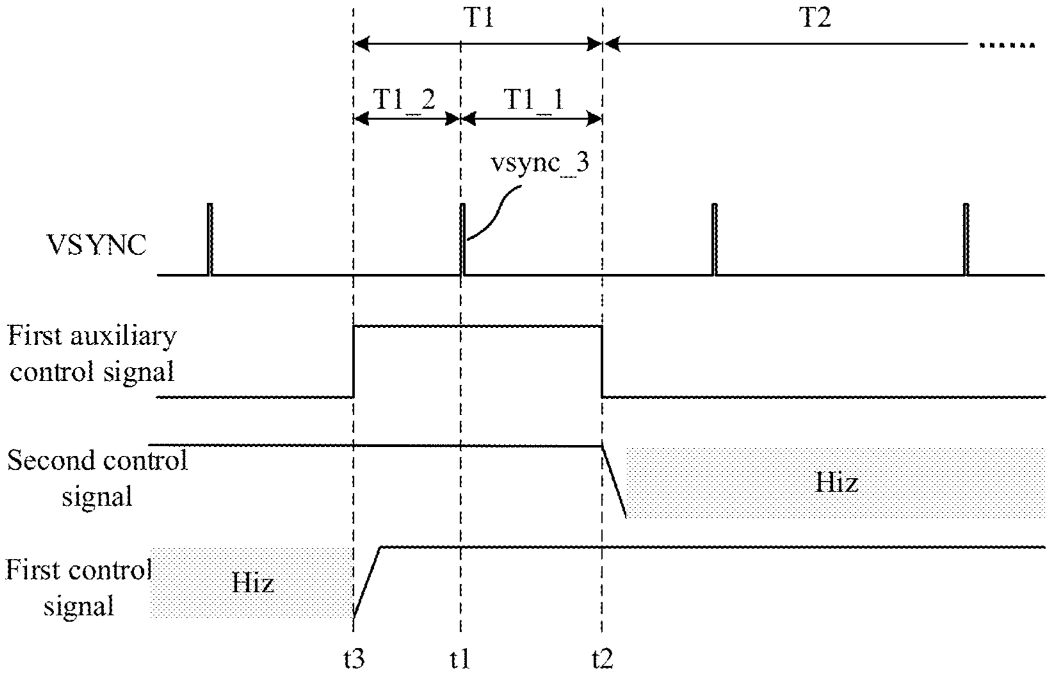
FIG. 4B schematically shows a signal timing diagram of an apparatus of controlling display according to another embodiment of the present disclosure.

FIG. 4B schematically shows a signal timing diagram of an apparatus of controlling display according to another embodiment of the present disclosure.

As shown in FIG. 4B, the display transition period T1 may include a first display transition sub-period T1_1 and a second display transition sub-period T1_2 before the first display transition sub-period T1_1. The application processor control circuit may be configured to allow the first auxiliary control signal to be at an active level at a third predetermined time of the second display transition sub-period T1_2 and allow the first auxiliary control signal to be at an inactive level at the second predetermined time of the first display transition sub-period.

The first auxiliary control signal may be used to control the second control signal to maintain the active level during the display transition period T1.

The third predetermined time of the second display transition sub-period T1_2 may be a third predetermined time t3 of the display transition period T1, which may be a time before the first predetermined time of the display transition period.

Specific operations of the timing control sub-circuit performed to allow the first control signal to be at the active level at the first predetermined time of the display transition period and allow the second control signal to be at the inactive level at the second predetermined time of the display transition period will be described below with reference to FIG. 4C to FIG. 4F.

At the first predetermined time of the first display transition sub-period, the first control signal is allowed to be at the active level according to a third vertical synchronization pulse vsync_3. At the second predetermined time of the first display transition sub-period, the first auxiliary control signal is allowed to be at the inactive level so that the second control signal is at the inactive level.

The third vertical synchronization pulse vsync_3 is a first pulse of a second vertical synchronization signal in the first display transition sub-period.

Figure 4C:
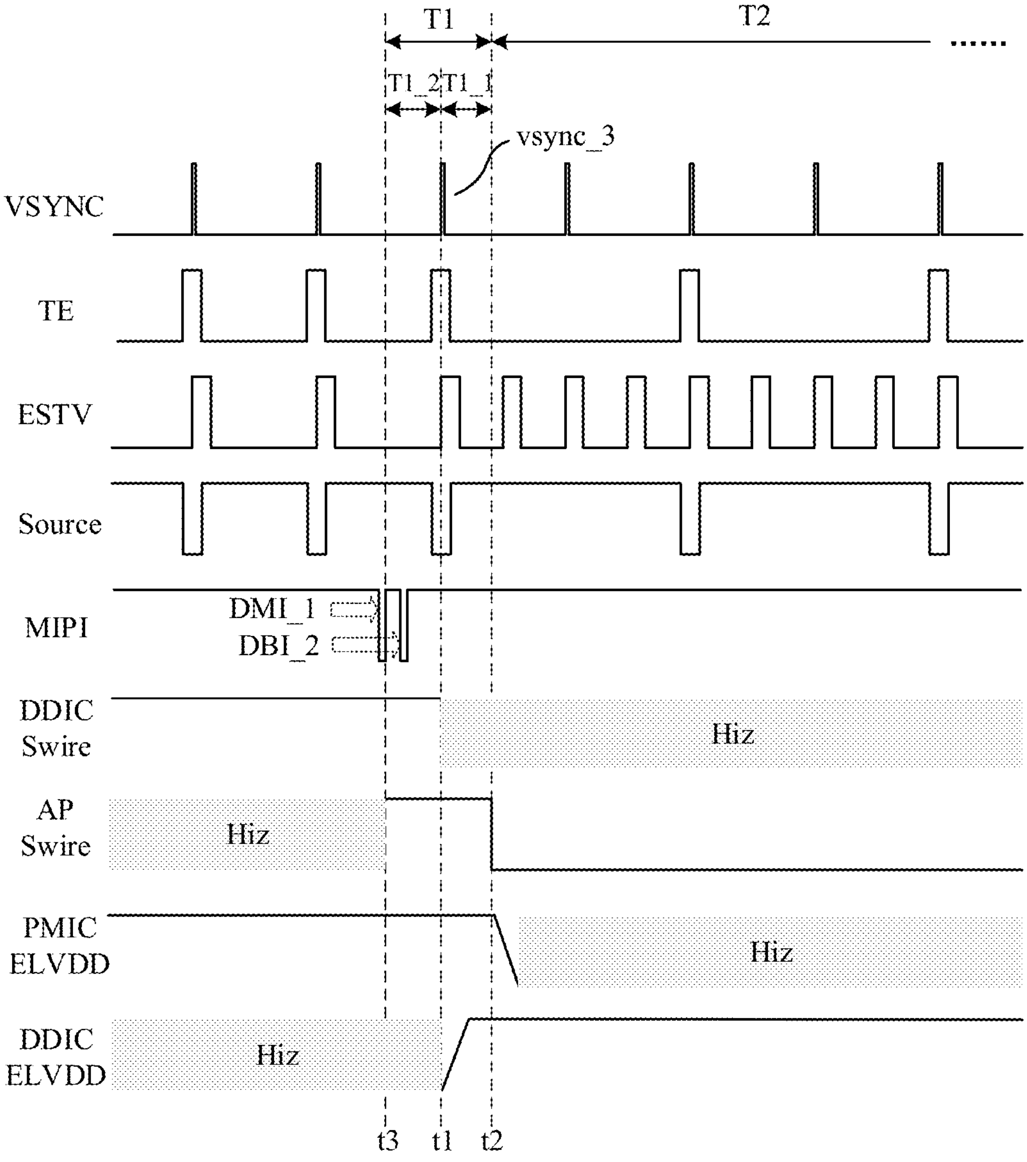
FIG. 4C schematically shows a signal timing diagram of an apparatus of controlling display according to another embodiment of the present disclosure.

FIG. 4C schematically shows a signal timing diagram of an apparatus of controlling display according to another embodiment of the present disclosure.

As shown in FIG. 4C, if the first display mode is the normal mode and the second display mode is the AOD mode, the first control signal is DDIC ELVDD, and the second control signal is PMIC ELVDD. The actual brightness value in the first display mode is determined by the first set of mapping relationships, and the actual brightness value in the second display mode is determined by the second set of mapping relationships. The first set of mapping relationships and the second set of mapping relationships may be stored in the same register, such as the first control register. The PMIC that controls the second control signal is controlled by DDIC Swire.

In FIG. 4C, at the third predetermined time of the second display transition sub-period T1_2, which may be a third predetermined time t3 of a display transition period T1 in FIG. 4C, a display mode switching instruction DMI_1 and a display brightness value switching instruction DBI_2 are received through the MIPI of the display device, and the first auxiliary control signal is adjusted from an inactive state to an active state. At the first predetermined time of the first display transition sub-period T1_1, which may be a first predetermined time t1 of the display transition period T1 in FIG. 4C, a third vertical synchronization pulse vsync_3 is detected, the display mode switching instruction DMI_1 is triggered to adjust the second control signal from the inactive level to the active level, and the DDIC Swire is adjusted from the active level to the inactive level. The second control signal is controlled by the first auxiliary control signal, the ESTV is adjusted from one pulse per frame in the first display mode to four pulses per frame in the second display mode, and the source is adjusted from the second display brightness value corresponding to the second actual brightness value in the first display mode to the first display brightness value corresponding to the first actual brightness value in the first display mode. At the second predetermined time of the first display transition sub-period T1_1, which may be a second predetermined time t2 of the display transition period T1 shown in FIG. 4C, in response to a detection that the active level of the first auxiliary control signal has been maintained for one frame, the first auxiliary control signal is adjusted from the active level to the inactive level, so that the second control signal is adjusted from the active level to the inactive level. A frequency corresponding to each frame is the first display frequency corresponding to the second display mode.

Figure 4D:
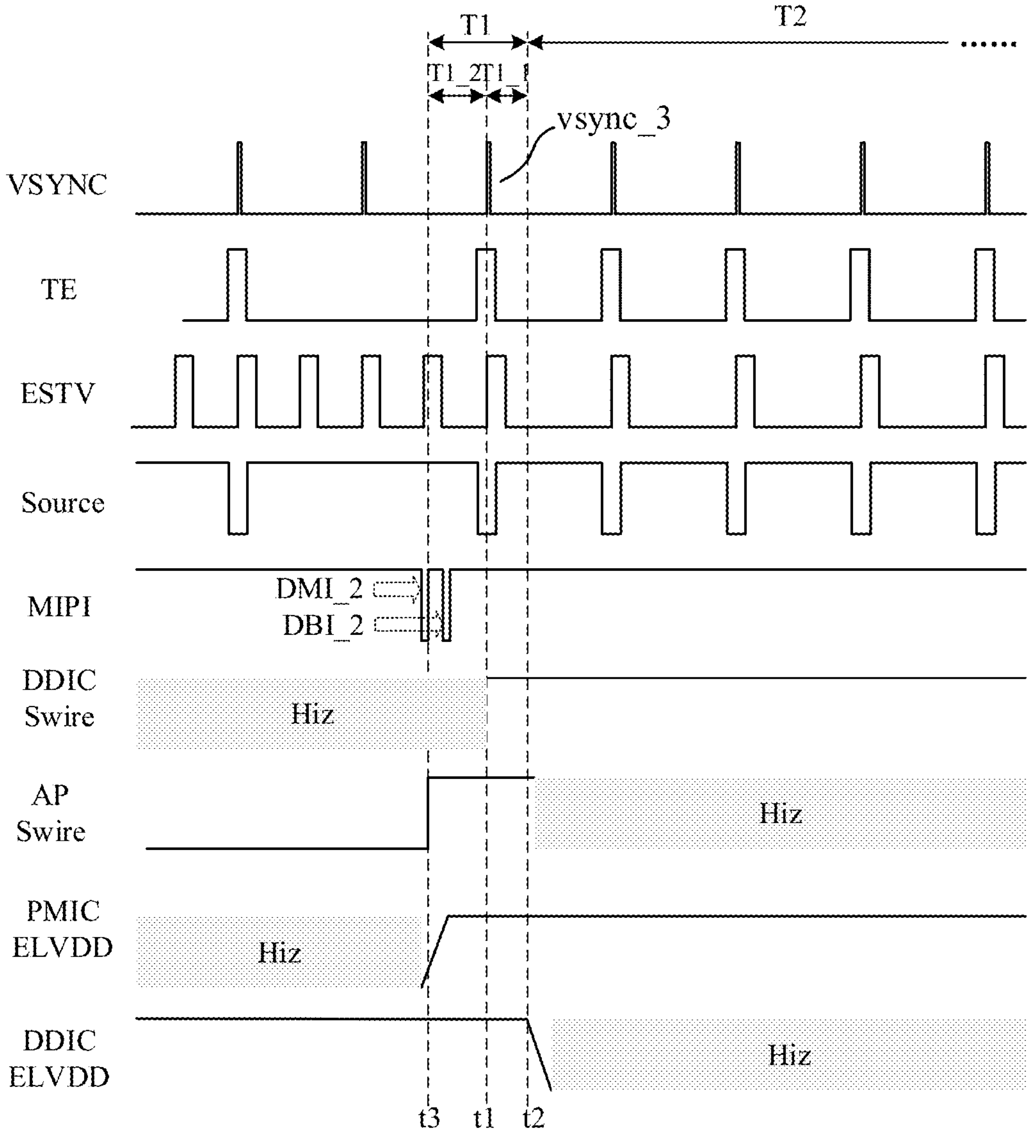
FIG. 4D schematically shows a signal timing diagram of an apparatus of controlling display according to another embodiment of the present disclosure.

FIG. 4D schematically shows a signal timing diagram of an apparatus of controlling display according to another embodiment of the present disclosure.

As shown in FIG. 4D, different from FIG. 4C, the first display mode is the AOD mode, the second display mode is the normal mode, the first control signal is the PMIC ELVDD, and the second control signal is the DDIC ELVDD. The actual brightness value in the first display mode is determined by the second set of mapping relationships, and the actual brightness value in the second display mode is determined by the first set of mapping relationships. The PMIC that controls the first control signal is mainly controlled by the DDIC Swire.

In FIG. 4D, at the third predetermined time of the second display transition sub-period T1_2, which may be the third predetermined time t3 of the display transition period T1 in FIG. 4D, a display mode switching instruction DMI_2 and a display brightness value switching instruction DBI_2 are received by the MIPI of the display device, and the first auxiliary control signal is adjusted from the inactive state to the active state so that the first control signal is adjusted from the inactive level to the active level. At the first predetermined time of the first display transition sub-time period T1_1, which may be a first predetermined time t1 of a display transition period T1 in FIG. 4D, a third vertical synchronization pulse vsync_3 is detected, the display mode switching instruction DMI_2 is triggered to adjust the second control signal from the active level to the inactive level, the DDIC Swire is adjusted from the inactive level to the active level, the ESTV is adjusted from one pulse per frame in the first display mode to four pulses per frame in the second display mode, and the source is adjusted from the second display brightness value corresponding to the second actual brightness value in the first display mode to the first display brightness value corresponding to the first actual brightness value in the first display mode. At the second predetermined time of the first display transition sub-period T1_1, which may be a second predetermined time t2 of the display transition period T1 shown in FIG. 4D, in response to a detection that the active level of the first auxiliary control signal has been maintained for one frame, the first auxiliary control signal is adjusted from the active level to an inactive level, and the first control signal is controlled by the DDIC Swire. A frequency corresponding to each frame is the second display frequency corresponding to the first display mode.

Figure 4E:
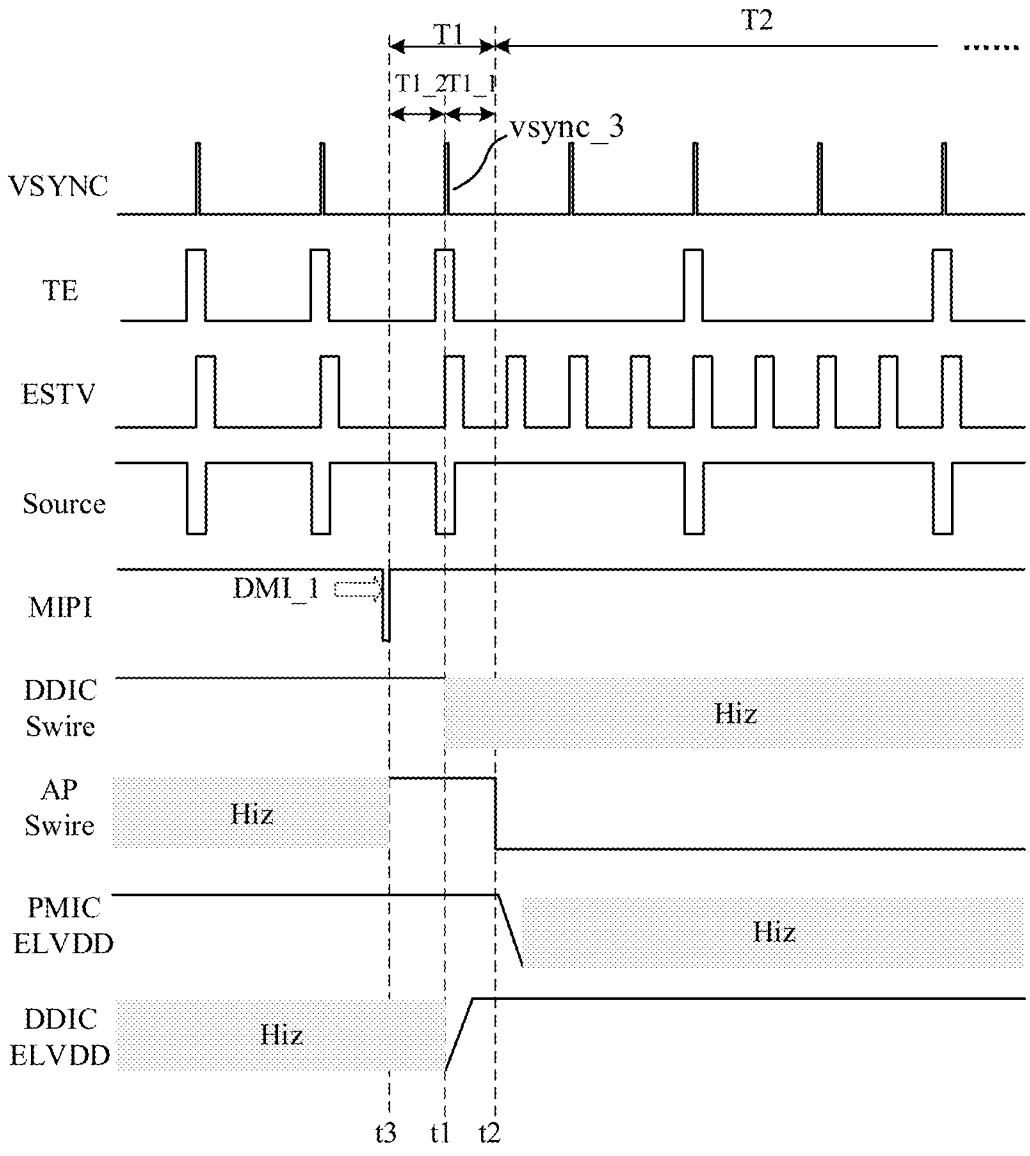
FIG. 4E schematically shows a signal timing diagram of an apparatus of controlling display according to another embodiment of the present disclosure.

FIG. 4E schematically shows a signal timing diagram of an apparatus of controlling display according to another embodiment of the present disclosure.

As shown in FIG. 4E, different from FIG. 4C, the actual brightness value in the first display mode and the actual brightness value in the second display mode are both determined by the first set of mapping relationships. Since the actual brightness value in the first display mode and the actual brightness value in the second display mode are both determined by the first set of mapping relationships, in a case that the second actual brightness value corresponding to the first display mode is identical with the first actual brightness value corresponding to the second display mode, the display brightness value switching instruction may not be required, and it is only needed to receive the display mode switching instruction DMI_1 through the MIPI of the display device. For changes in other signal changes in FIG. 4E, reference may be made to FIG. 4C, which will not be repeated here.

Figure 4F:
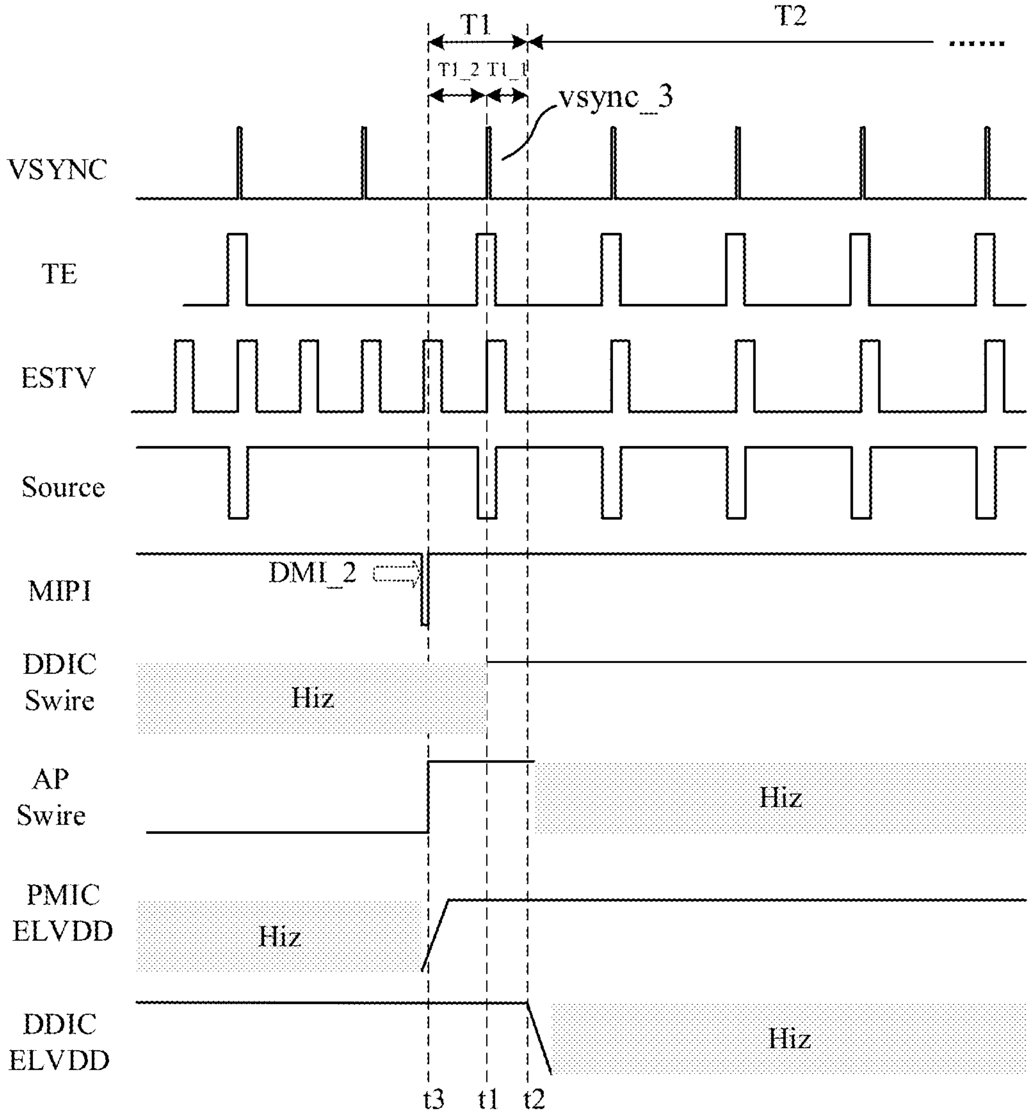
FIG. 4F schematically shows a signal timing diagram of an apparatus of controlling display according to another embodiment of the present disclosure.

FIG. 4F schematically shows a signal timing diagram of an apparatus of controlling display according to another embodiment of the present disclosure.

As shown in FIG. 4F, different from FIG. 4D, the actual brightness value in the first display mode and the actual brightness value in the second display mode are both determined by the first set of mapping relationships. Since the actual brightness value in the first display mode and the actual brightness value in the second display mode are both determined by the first set of mapping relationships, in a case that the second actual brightness value corresponding to the first display mode is identical with the first actual brightness value corresponding to the second display mode, the display brightness value switching instruction may not be required, and it is only needed to receive the display mode switching instruction DMI_2 through the MIPI of the display device. For changes in other signals in FIG. 4F, reference may be made to FIG. 4D, which will not be repeated here.

In FIG. 4E and FIG. 4F, the display brightness value switching instruction is not required, and an execution of the display brightness value switching instruction is eliminated, so that the efficiency of display mode switching may be improved.

For ease of understanding, in FIG. 4B to FIG. 4F, the start time of the display transition period is the third predetermined time t3 of the display transition period T1, the end time of the display transition period is the second predetermined time t2 of the display transition period T1, and the first predetermined time of the first display transition period is the first predetermined time of the display transition period. However, the present disclosure is not limited thereto. The start time of the display transition period may also be a time before the third predetermined time t3 of the display transition period T1, and the end time of the display transition period may also be a time after the second predetermined time t2 of the display transition period T1.

Figure 5A:
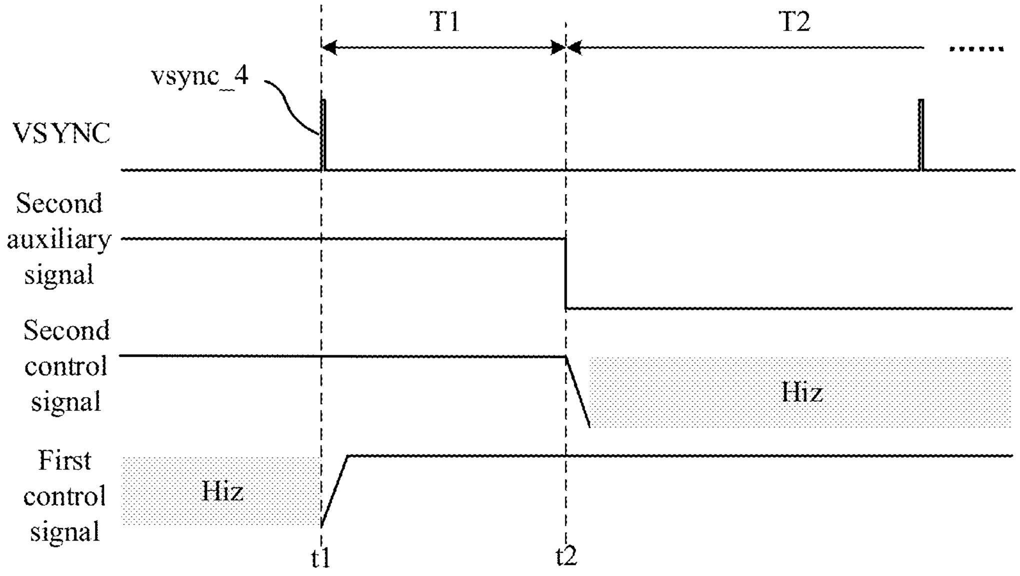
FIG. 5A schematically shows a signal timing diagram of an apparatus of controlling display according to another embodiment of the present disclosure.

FIG. 5A schematically shows a signal timing diagram of an apparatus of controlling display according to another embodiment of the present disclosure.

As shown in FIG. 5A, the display transition period T1 may include a first display transition sub-period. A first predetermined time of the first display transition sub-period may be a first predetermined time t1 of the display transition period T1, and a second predetermined time of the first display transition sub-period may be a second predetermined time t3 of the display transition period T1. At the first predetermined time of the first display transition sub-period, the first control signal is allowed to be at an active level according to a fourth vertical synchronization pulse vsync_4. At the second predetermined time of the first display transition sub-period, the second auxiliary control signal is allowed to be at an inactive level, so that the second control signal is at an inactive level.

The fourth vertical synchronization pulse vsync_4 is a first pulse of a third vertical synchronization signal in the first display transition sub-period.

The second auxiliary control signal is at an active level at a remaining time of the first display transition sub-period.

Specific operations of the timing control sub-circuit performed to allow the first control signal to be at the active level according to a fourth vertical synchronization pulse vsync_4 at the first predetermined time in the display transition sub-period and allow the second auxiliary control signal to be at an inactive level so that the second control signal is at an inactive level at the second predetermined time of the display transition sub-period will be described below with reference to FIG. 5B to FIG. 5E.

The timing control sub-circuit may be further configured to extend an active duration of the second auxiliary control signal by a predetermined duration from a time corresponding to the fourth vertical synchronization pulse vsync_4 according to the fourth vertical synchronization pulse vsync_4.

The predetermined duration corresponds to a duration of P frames, where P is greater than or equal to one-eighth and less than or equal to one-half. A frequency corresponding to each frame is the second display frequency corresponding to the first display mode.

Figure 5B:
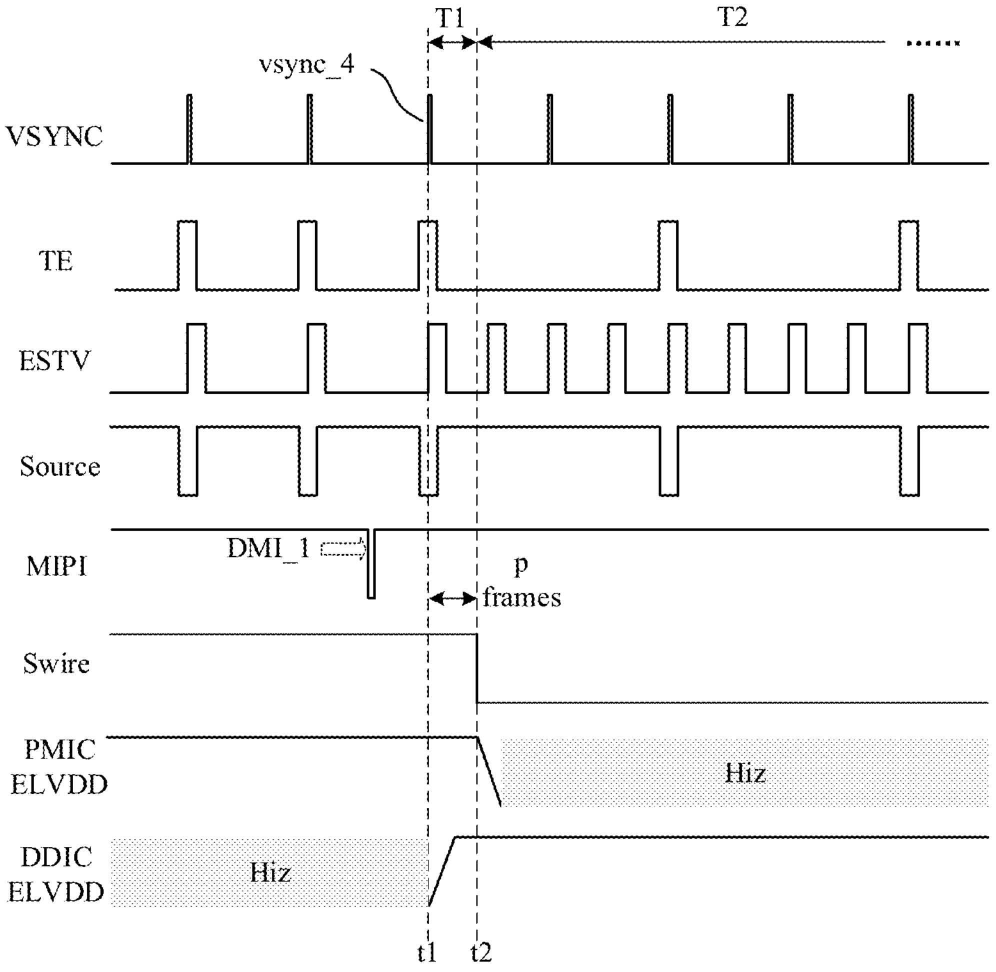
FIG. 5B schematically shows a signal timing diagram of an apparatus of controlling display according to another embodiment of the present disclosure.

FIG. 5B schematically shows a signal timing diagram of an apparatus of controlling display according to another embodiment of the present disclosure.

As shown in FIG. 5B, if the first display mode is the normal mode and the second display mode is the AOD mode, the first control signal is DDIC ELVDD, and the second control signal is PMIC ELVDD. The actual brightness value in the first display mode and the actual brightness value in the second display mode are both determined by the first set of mapping relationships. The second control signal is mainly controlled by the second auxiliary control signal (i.e., Swire).

Since the actual brightness value in the first display mode and the actual brightness value in the second display mode are both determined by the first set of mapping relationships, in a case that the second actual brightness value corresponding to the first display mode is identical with the first actual brightness value corresponding to the second display mode, the display brightness value switching instruction may not be required, and it is only needed to receive the display mode switching instruction DMI_1 through the MIPI of the display device. At the first predetermined time of the first display sub-period, which may be a first predetermined time t1 of a display transition period T1 in FIG. 5B, a fourth vertical synchronization pulse vsync_4 is detected, the display mode switching instruction DMI_1 is triggered, the first control signal is adjusted from the inactive level to the active level, the active duration of the second auxiliary control signal is extended by a predetermined duration of P frames from a time corresponding to the fourth vertical synchronization pulse vsync_4 through the control register, the ESTV is adjusted from one pulse per frame in the first display mode to four pulses per frame in the second display mode, the source is adjusted from the second display brightness value corresponding to the second actual brightness value in the first display mode to the first display brightness value corresponding to the first actual brightness value in the first display mode, and the Swire changes from an active level to an inactive level. At the second predetermined time of the first display transition sub-period, which may be a second predetermined time t2 of the display transition period T1 in FIG. 5B, in response to a detection that the second auxiliary control signal is extended by P frames from the first predetermined time t1, the second auxiliary control signal changes from the active level to an inactive level, so that the second control signal changes from the active level to an inactive level. A frequency corresponding to each frame is the first display frequency corresponding to the second display mode. For example, the first display frequency may be 60 Hz.

Figure 5C:
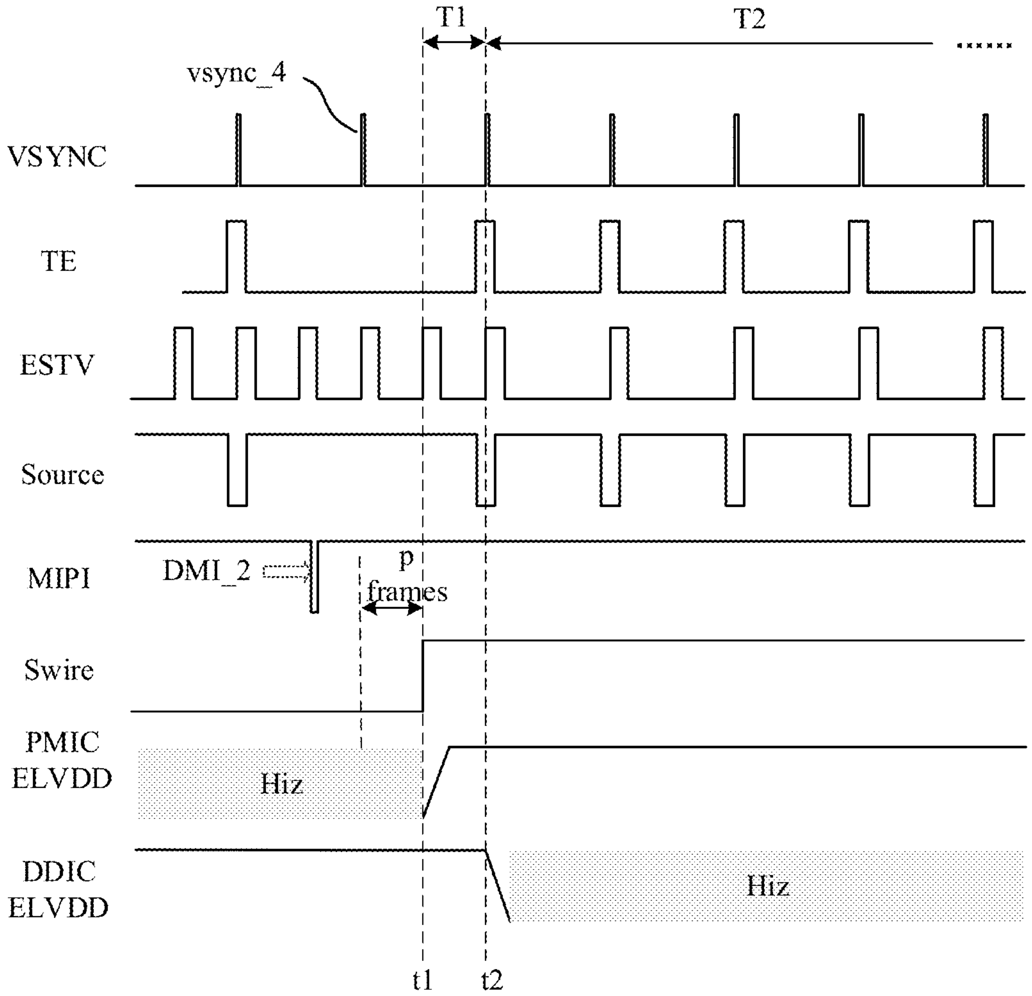
FIG. 5C schematically shows a signal timing diagram of an apparatus of controlling display according to another embodiment of the present disclosure.

FIG. 5C schematically shows a signal timing diagram of an apparatus of controlling display according to another embodiment of the present disclosure.

As shown in FIG. 5C, different from FIG. 5B, the first display mode is the AOD mode, the second display mode is the normal mode, the first control signal is the PMIC ELVDD, and the second control signal is the DDIC ELVDD.

In FIG. 5C, a display mode switching instruction DMI_2 is received through the MIPI of the display device. At the first predetermined time of the first display sub-period, which may be a first predetermined time t1 of a display transition period T1 in FIG. 5C, a fourth vertical synchronization pulse vsync_4 is detected, a display mode switching instruction DMI_2 is triggered, the active duration of the second auxiliary control signal is extended by a predetermined duration of P frames from a time corresponding to the fourth vertical synchronization pulse vsync_4 through the control register, the ESTV is adjusted from four pulses per frame in the first display mode to one pulse per frame in the second display mode, and the source is adjusted from the second display brightness value corresponding to the second actual brightness value in the first display mode to the first display brightness value corresponding to the first actual brightness value in the first display mode. At the second predetermined time of the first display sub-period, which may be a second predetermined time t2 of the display transition period T1 in FIG. 5C, it is detected that the second auxiliary control signal is extended by P frames from the first predetermined time t1, and the second auxiliary control signal is adjusted from the inactive level to the active level so that the second control signal is adjusted from the active level to the inactive level, where a frequency corresponding to each frame is the first display frequency corresponding to the first display mode. At the second predetermined time of the first display transition sub-period, which may be a second predetermined time t2 of the display transition period T1 in FIG. 5C, a pulse following the fourth vertical synchronous pulse vsync_4 of the VSYNC is detected, and the second control signal is adjusted from the active level to the inactive level.

In FIG. 5B and FIG. 5C, the display brightness value switching instruction is not required, and an execution of the display brightness value switching instruction is eliminated, so that the efficiency of display mode switching may be improved.

Figure 5D:
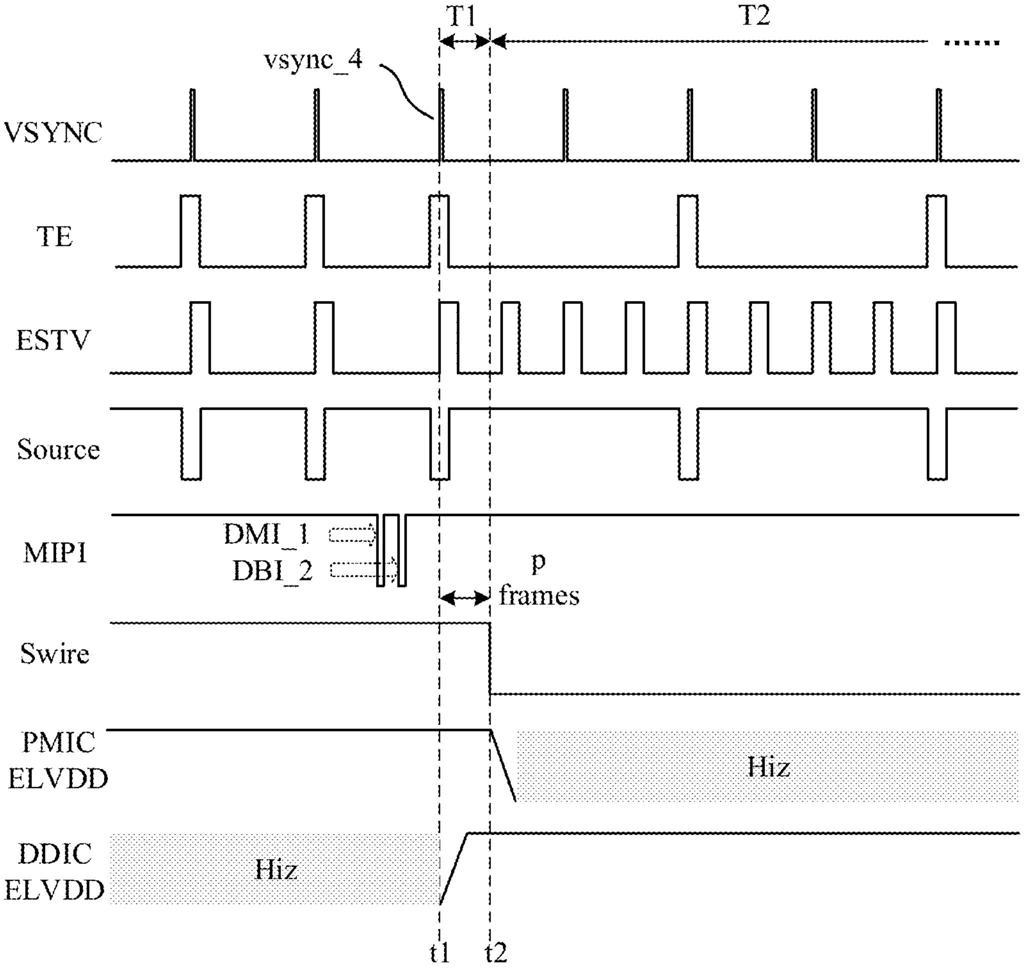
FIG. 5D schematically shows a signal timing diagram of an apparatus of controlling display according to another embodiment of the present disclosure.

FIG. 5D schematically shows a signal timing diagram of an apparatus of controlling display according to another embodiment of the present disclosure.

As shown in FIG. 5D, different from FIG. 5B, the actual brightness value in the first display mode is determined by the first set of mapping relationships, and the actual brightness value in the second display mode is determined by the second set of mapping relationships. The first set of mapping relationships and the second set of mapping relationships may be stored in the same control register, such as the first control register.

Since the actual brightness value in the first display mode and the actual brightness value in the second display mode are determined by different sets of mapping relationships, in a case that the second actual brightness value corresponding to the first display mode is identical with the first actual brightness value corresponding to the second display mode, the display brightness value switching instruction is required to switch the second display brightness value corresponding to the second actual brightness value to the first display brightness value corresponding to the first actual brightness value. The display mode switching instruction DMI_1 and the display brightness value switching instruction DBI_2 may be received through the MIPI of the display device. For changes in other signals in FIG. 5D, reference may be made to FIG. 5B, which will not be repeated here.

Figure 5E:
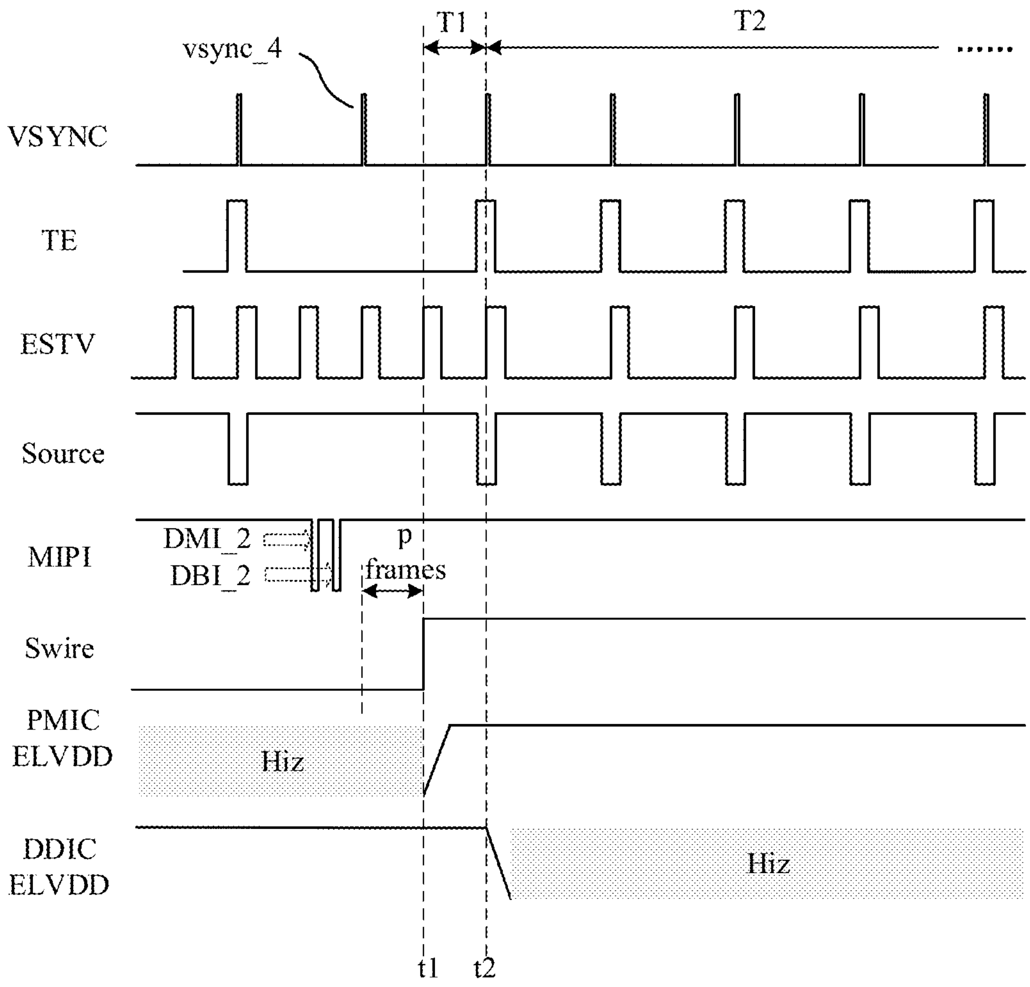
FIG. 5E schematically shows a signal timing diagram of an apparatus of controlling display according to another embodiment of the present disclosure.

FIG. 5E schematically shows a signal timing diagram of an apparatus of controlling display according to another embodiment of the present disclosure.

As shown in FIG. 5E, different from FIG. 5C, the actual brightness value in the first display mode is determined by the first set of mapping relationships, and the actual brightness value in the second display mode is determined by the second set of mapping relationships. The first set of mapping relationships and the second set of mapping relationships may be stored in the same control register, such as the first control register.

Since the actual brightness value in the first display mode and the actual brightness value in the second display mode are determined by different sets of mapping relationships, in a case that the second actual brightness value corresponding to the first display mode is identical with the first actual brightness value corresponding to the second display mode, the display brightness value switching instruction is required to switch the second display brightness value corresponding to the second actual brightness value to the first display brightness value corresponding to the first actual brightness value. The display mode switching instruction DMI_2 and the display brightness value switching instruction DBI_2 may be received through the MIPI of the display device. For changes in other signals in FIG. 5E, reference may be made to FIG. 5C, which will not be repeated here.

For ease of understanding, in FIG. 5A to FIG. 5E, the start time of the display transition period is the first predetermined time t1 of the display transition period T1, and the end time of the display transition period is the second predetermined time t2 of the display transition period T1. However, the present disclosure is not limited thereto. The start time of the display transition period may also be a time before the first predetermined time t1 of the display transition period T1, and the end time of the display transition period may also be a time after the second predetermined time t2 of the display transition period T1.

Figure 6:
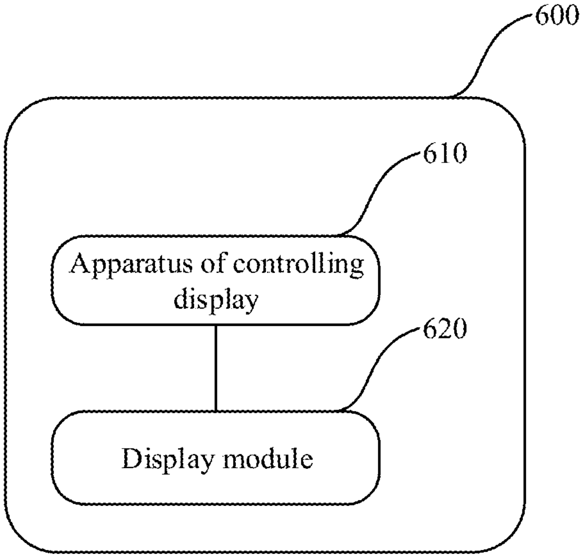
FIG. 6 schematically shows a block diagram of a display device according to an embodiment of the present disclosure.

FIG. 6 schematically shows a block diagram of a display device according to an embodiment of the present disclosure.

As shown in FIG. 6, a display device 600 may include an apparatus 610 of controlling display according to the embodiments of the present disclosure and a display module 620.

The display module 620 may be configured to display in a second display mode according to a first control signal provided by the apparatus of controlling display.

According to embodiments of the present disclosure, the apparatus 610 of controlling display may refer to the apparatus 200 of controlling display in the aforementioned embodiments, which will not be repeated here.

Figure 7:
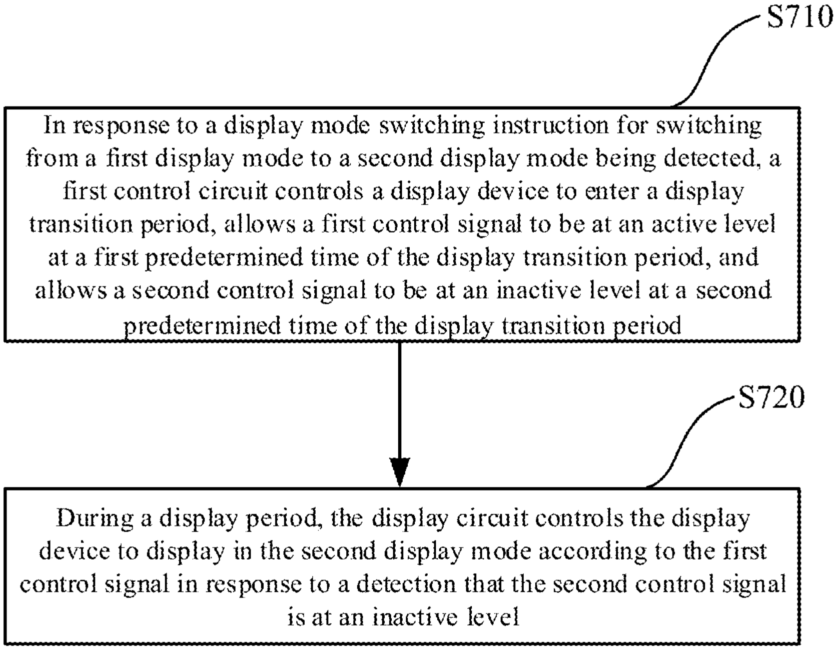
FIG. 7 schematically shows a flowchart of a method of controlling display according to an embodiment of the present disclosure.

FIG. 7 schematically shows a flowchart of a method of controlling display according to an embodiment of the present disclosure.

As shown in FIG. 7, the method of controlling display is applicable to the apparatus of controlling display according to embodiments of the present disclosure, and the method of controlling display includes operation S710 and operation S720.

In operation S710, in response to a display mode switching instruction for switching from a first display mode to a second display mode being detected, a first control circuit controls a display device to enter a display transition period, allows a first control signal to be at an active level at a first predetermined time of the display transition period, and allows a second control signal to be at an inactive level at a second predetermined time of the display transition period.

For example, operation S710 may refer to the first control circuit 210 in the aforementioned embodiments, which will not be repeated here.

In operation S720, during a display period, the display circuit controls the display device to display in the second display mode according to the first control signal in response to a detection that the second control signal is at an inactive level.

The second control signal is used to control the display device to display in the first display mode.

For example, operation S720 may refer to the display circuit 220 in the aforementioned embodiments, which will not be repeated here.

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined and/or integrated in various ways, even if such combinations or integrations are not explicitly described in the present disclosure. In particular, without departing from the spirit and teachings of the present disclosure, the various embodiments of the present disclosure and/or the features described in the claims may be combined and/or integrated in various ways. All these combinations and/or integrations fall within the scope of the present disclosure.

Embodiments of the present disclosure have been described above. However, these embodiments are for illustrative purposes only, and are not intended to limit the scope of the present disclosure. Although the various embodiments have been described separately above, it does not mean that measures in the separate embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. An apparatus of controlling display, comprising:

a first control circuit configured to, in response to a display mode switching instruction for switching from a first display mode to a second display mode being detected, control a display device to enter a display transition period, allow a first control signal to be at an active level at a first predetermined time of the display transition period, and allow a second control signal to be at an inactive level at a second predetermined time of the display transition period; and a display circuit configured to, in response to a detection that the second control signal is at the inactive level, control the display device to display in the second display mode according to the first control signal during a display period;

wherein the second control signal is configured to control the display device to display in the first display mode;

wherein the first control circuit comprises:

a timing control sub-circuit configured to allow the first control signal to be at the active level at the first predetermined time of the display transition period and allow the second control signal to be at the inactive level at the second predetermined time of the display transition period; and a brightness control sub-circuit configured to determine a first display brightness value corresponding to the second display mode according to a first actual brightness value corresponding to the second display mode during the display transition period; and wherein the display circuit is configured to control the display device to display in the second display mode according to the first control signal by:

configuring a display brightness value of the display device to the first display brightness value under the control of the first control signal so that the display device is displayed with the first actual brightness value.

2. The apparatus of claim 1, wherein the brightness control sub-circuit is configured to determine the first display brightness value corresponding to the second display mode according to the first actual brightness value corresponding to the second display mode by one of:

determining the first display brightness value corresponding to the second display mode from one of a first set of mapping relationships and a second set of mapping relationships according to the first actual brightness value corresponding to the second display mode, in response to a display brightness value switching instruction being detected; and determining the first display brightness value corresponding to the second display mode from the first set of mapping relationships according to the first actual brightness value corresponding to the second display mode;

wherein the first set of mapping relationships comprises at least one first mapping relationship, and the first mapping relationship represents a relationship between the actual brightness value and the display brightness value in a case of supplying power to the display device by a power management integrated circuit PMIC; and wherein the second set of mapping relationships comprises at least one second mapping relationship, and the second mapping relationship represents a relationship between the actual brightness value and the display brightness value in a case of supplying power to the display device by a display driver integrated circuit DDIC.

3. The apparatus of claim 2, wherein the first control circuit further comprises:

a first control register configured to store the first set of mapping relationships; and a second control register configured to store the second set of mapping relationships.

4. The apparatus of claim 1, wherein the second display mode corresponds to a first display frequency determined according to a tear effect signal.

5. The apparatus of claim 1, wherein the display transition period comprises a first display transition sub-period; and wherein the timing control sub-circuit is configured to allow the first control signal to be at the active level at the first predetermined time of the display transition period and allow the second control signal to be at the inactive level at the second predetermined time of the display transition period by:

allowing the first control signal to be at the active level according to a first vertical synchronization pulse at the first predetermined time of the first display transition sub-period and allowing the second control signal to be at the inactive level according to a second vertical synchronization pulse at the second predetermined time of the first display transition sub-period, wherein the first vertical synchronization pulse is a first pulse of a first vertical synchronization signal in the first display transition sub-period, the second vertical synchronization pulse is a pulse away from the first vertical synchronization pulse by a cycle of a first display frequency in the first vertical synchronization signal, and the first display frequency corresponds to the second display mode.

6. The apparatus of claim 5, wherein the first vertical synchronization signal has a same frequency as a first tear effect signal corresponding to the second display mode, the first tear effect signal is ahead of the first vertical synchronization signal by M frames, M is greater than or equal to one-eighth and less than or equal to one-half, and a frequency of each frame is a second display frequency corresponding to the first display mode.

7. The apparatus of claim 1, wherein the display transition period comprises a first display transition sub-period and a second display transition sub-period before the first display transition sub-period; and wherein the apparatus further comprises:

an application processor control circuit configured to allow a first auxiliary control signal to be at an active level at a third predetermined time of the second display transition sub-period and allow the first auxiliary control signal to be at an inactive level at a second predetermined time of the first display transition sub-period, wherein the first auxiliary control signal is configured to control the second control signal to maintain the active level during the display transition period.

8. The apparatus of claim 7, wherein the timing control sub-circuit is configured to allow the first control signal to be at the active level at the first predetermined time of the display transition period and allow the second control signal to be at the inactive level at the second predetermined time of the display transition period by:

allowing the first control signal to be at the active level according to a third vertical synchronization pulse at the first predetermined time of the first display transition sub-period, and allowing the second control signal to be at the inactive level by allowing the first auxiliary control signal to be at the inactive level at the second predetermined time of the first display transition sub-period, wherein the third vertical synchronization pulse is a first pulse of a second vertical synchronization signal in the first display transition sub-period.

9. The apparatus of claim 1, wherein the display transition period comprises a first display transition sub-period; and wherein the timing control sub-circuit is configured to allow the first control signal to be at the active level at the first predetermined time of the display transition period and allow the second control signal to be at the inactive level at the second predetermined time of the display transition period by:

allowing the first control signal to be at the active level according to a fourth vertical synchronization pulse at the first predetermined time of the first display transition sub-period, and allowing the second control signal to be at the inactive level by allowing the second auxiliary control signal to be at an inactive level at the second predetermined time of the first display transition sub-period, wherein the fourth vertical synchronization pulse is a first pulse of a third vertical synchronization signal in the first display transition sub-period, and the second auxiliary control signal is at the active level at a remaining time of the first display transition sub-period.

10. The apparatus of claim 9, wherein the timing control sub-circuit is further configured to:

extend an active duration of the second auxiliary control signal by a predetermined duration from a time corresponding to the fourth vertical synchronization pulse according to the fourth vertical synchronization pulse, wherein the predetermined duration corresponds to a duration of P frames, P is greater than or equal to one-eighth and less than or equal to one-half, and a frequency corresponding to each frame is a second display frequency corresponding to the first display mode.

11. The apparatus of claim 1, wherein the first control signal is provided by DDIC and the second control signal is provided by PMIC in a case that the first display mode is a normal mode and the second display mode is an always on display AOD mode; and wherein the first control signal is provided by the PMIC and the second control signal is provided by the DDIC in a case that the first display mode is the AOD mode and the second display mode is the normal mode.

12. The apparatus of claim 11, wherein in the case that the first display mode is the normal mode and the second display mode is the AOD mode, the apparatus further comprises:

a second control circuit configured to generate the display mode switching instruction in a case that that an actual brightness value of the display device is a second actual brightness value corresponding to the first display mode, wherein the second actual brightness value is an actual brightness value matched with the second display mode.

13. The apparatus of claim 11, wherein in the case that the first display mode is the normal mode and the second display mode is the AOD mode, the second control circuit is further configured to:

adjust, under the control of a third control signal, a display brightness value of the display device from a third display brightness value corresponding to the first display mode to a second display brightness value corresponding to the first display mode according to a first set of mapping relationships so that the actual brightness value of the display device is adjusted from a third actual brightness value corresponding to the first display mode to a second actual brightness value corresponding to the first display mode, wherein the third control signal is provided by the PMIC, the third display brightness value corresponds to the third actual brightness value, and the second display brightness value corresponds to the second actual brightness value.

14. The apparatus of claim 13, wherein the second control circuit is configured to adjust the display brightness value of the display device from the third display brightness value corresponding to the first display mode to the second display brightness value corresponding to the first display mode according to the first set of mapping relationships so that the actual brightness value of the display device is adjusted from the third actual brightness value corresponding to the first display mode to the second actual brightness value corresponding to the first display mode by:

gradually adjusting the display brightness value of the display device from the third display brightness value corresponding to the first display mode to the second display brightness value corresponding to the first display mode according to the first set of mapping relationships so that the actual brightness value of the display device is gradually adjusted from the third actual brightness value corresponding to the first display mode to the second actual brightness value corresponding to the first display mode.

15. A display device, comprising:

the apparatus of controlling display of claim 1; and a display module configured to display in a second display mode according to a first control signal provided by the apparatus of controlling display.

16. A method of controlling display, applicable to the apparatus of controlling display of claim 1, the method comprising:

controlling, by using a first control circuit, a display device to enter a display transition period, allowing a first control signal to be at an active level at a first predetermined time of the display transition period, and allowing a second control signal to be at an inactive level at a second predetermined time of the display transition period, in response to a display mode switching instruction for switching from a first display mode to a second display mode being detected; and controlling, by using a display circuit, the display device to display in the second display mode according to the first control signal during a display period, in response to a detection that the second control signal is at the inactive level;

wherein the second control signal is configured to control the display device to display in the first display mode.

17. The apparatus of claim 2, wherein the display transition period comprises a first display transition sub-period; and wherein the timing control sub-circuit is configured to allow the first control signal to be at the active level at the first predetermined time of the display transition period and allow the second control signal to be at the inactive level at the second predetermined time of the display transition period by:

allowing the first control signal to be at the active level according to a first vertical synchronization pulse at the first predetermined time of the first display transition sub-period and allowing the second control signal to be at the inactive level according to a second vertical synchronization pulse at the second predetermined time of the first display transition sub-period, wherein the first vertical synchronization pulse is a first pulse of a first vertical synchronization signal in the first display transition sub-period, the second vertical synchronization pulse is a pulse away from the first vertical synchronization pulse by a cycle of a first display frequency in the first vertical synchronization signal, and the first display frequency corresponds to the second display mode.

18. The apparatus of claim 3, wherein the display transition period comprises a first display transition sub-period; and wherein the timing control sub-circuit is configured to allow the first control signal to be at the active level at the first predetermined time of the display transition period and allow the second control signal to be at the inactive level at the second predetermined time of the display transition period by:

allowing the first control signal to be at the active level according to a first vertical synchronization pulse at the first predetermined time of the first display transition sub-period and allowing the second control signal to be at the inactive level according to a second vertical synchronization pulse at the second predetermined time of the first display transition sub-period, wherein the first vertical synchronization pulse is a first pulse of a first vertical synchronization signal in the first display transition sub-period, the second vertical synchronization pulse is a pulse away from the first vertical synchronization pulse by a cycle of a first display frequency in the first vertical synchronization signal, and the first display frequency corresponds to the second display mode.

19. The apparatus of claim 4, wherein the display transition period comprises a first display transition sub-period; and wherein the timing control sub-circuit is configured to allow the first control signal to be at the active level at the first predetermined time of the display transition period and allow the second control signal to be at the inactive level at the second predetermined time of the display transition period by:

allowing the first control signal to be at the active level according to a first vertical synchronization pulse at the first predetermined time of the first display transition sub-period and allowing the second control signal to be at the inactive level according to a second vertical synchronization pulse at the second predetermined time of the first display transition sub-period, wherein the first vertical synchronization pulse is a first pulse of a first vertical synchronization signal in the first display transition sub-period, the second vertical synchronization pulse is a pulse away from the first vertical synchronization pulse by a cycle of a first display frequency in the first vertical synchronization signal, and the first display frequency corresponds to the second display mode.

* * * * *